US012075341B2

(12) United States Patent
Takeda et al.

(10) Patent No.: US 12,075,341 B2
(45) Date of Patent: Aug. 27, 2024

(54) SEARCH SPACE SET GROUP SWITCHING FOR CROSS-CARRIER SCHEDULING

(71) Applicant: QUALCOMM Incorporated, San Diego, CA (US)

(72) Inventors: Kazuki Takeda, Tokyo (JP); Jing Sun, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/696,715

(22) Filed: Mar. 16, 2022

(65) Prior Publication Data

US 2022/0303880 A1    Sep. 22, 2022

Related U.S. Application Data

(60) Provisional application No. 63/163,673, filed on Mar. 19, 2021.

(51) Int. Cl.
*H04W 48/16*    (2009.01)
(52) U.S. Cl.
CPC .................. *H04W 48/16* (2013.01)
(58) Field of Classification Search
CPC ...... H04W 48/12; H04W 48/18; H04W 48/20
See application file for complete search history.

(56) References Cited

U.S. PATENT DOCUMENTS

| 2019/0305867 A1 | 10/2019 | Tseng et al. |
| 2020/0389874 A1 | 12/2020 | Lin et al. |

FOREIGN PATENT DOCUMENTS

| EP | 3940982 A1 * | 1/2022 | ............ H04L 5/0053 |
| WO | WO-2021160855 A1 * | 8/2021 | ............ H04W 48/12 |

OTHER PUBLICATIONS

International Search Report and Written Opinion—PCT/US2022/071199—ISA/EPO—Jun. 24, 2022.

(Continued)

*Primary Examiner* — Kevin Kim
(74) *Attorney, Agent, or Firm* — Holland & Hart / Qualcomm

(57) ABSTRACT

Methods, systems, and devices for wireless communications are described, that provide for configuration and switching between multiple groups of search space sets based on activated serving cells or activated resources for one or more serving cells. An access network entity may configure multiple groups of search space sets, and a user equipment (UE) may monitor for control information in an activated search space set group. A first group of search space sets may be activated based on a serving cell being activated, and the UE may switch to a second group of search space sets when the serving cell is deactivated. Search space set group switching also may be performed based on one or more activated bandwidth parts (BWPs). An access network entity may trigger search space set group switching using explicit signaling, based on cell activation/deactivation, based on a timer, or any combinations thereof.

30 Claims, 22 Drawing Sheets

(56) References Cited

OTHER PUBLICATIONS

Qualcomm Incorporated: "Fast SCG and SCell Activation", 3GPP Draft, 3GPP TSG-RAN WG1 #97, R1-1907306, Fast SCG and SCELL Activation, 3rd Generation Partnership Project (3GPP), Mobile Competence Centre, 650, Route Des Lucioles, F-06921, Sophia- Antipolis Cedex, France, vol. RAN WG1, No. Reno, USA, May 13, 2019-May 17, 2019, May 13, 2019 (May 13, 2019), XP057728746, XP051709329, pp. 1-11, Retrieved from the Internet: URL: http://www.3gpp.org/ftp/Meetings%5F3GPP%5FSYNC/RAN1/Docs/R1%2D1907306%2Ezip, http://www.3gpp.org/ftp/Meetings%5F3GPP%5FSYNC/RAN1/Docs/R1%2D1907306%2Ezip, [retrieved on May 13, 2019] Section 2.2.2, Section 2.2.1, p. third-p. fifth, figure 3, table 1, The whole document, p. 1, paragraph 2.1, p. 5, paragraph 2.3, p. 6, paragraph 2.3.1.

* cited by examiner

SEARCH SPACE SET GROUP SWITCHING FOR CROSS-CARRIER SCHEDULING

CROSS REFERENCE

The present Application for Patent claims the benefit of U.S. Provisional Patent Application No. 63/163,673 by TAKEDA et al., entitled "SEARCH SPACE SET GROUP SWITCHING FOR CROSS-CARRIER SCHEDULING," filed Mar. 19, 2021, assigned to the assignee hereof, and expressly incorporated by reference herein.

FIELD OF TECHNOLOGY

The following relates to wireless communications, including search space set group switching for cross-carrier scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, multiple serving cells, or component carriers (CCs), may be configured according to carrier aggregation (CA) techniques for concurrent communications between a UE and a base station or access network entity. When multiple serving cells are present, control information may be provided in one of the serving cells that provides a resource allocation for one or multiple of the serving cells. Efficient techniques for providing control information for multiple serving cells may help to enhance the efficiency of a wireless communications system.

SUMMARY

The described techniques relate to improved methods, systems, devices, and apparatuses that support search space set group switching for cross-carrier scheduling. Various aspects of the present disclosure provide techniques for configuration and switching between multiple groups of search space sets based on activated serving cells or activated resources for one or more serving cells. In some cases, an access network entity may configure a user equipment (UE) for carrier aggregation using multiple different serving cells including a primary cell (PCell) and one or more secondary cell (SCell). In some cases, the access network entity may configure multiple groups of search space sets, including a first group of search space sets and a second group of search space sets, where the UE monitors for downlink control information (DCI) in an activated search space set group (e.g., using a common search space (CSS) and a UE-specific search space (USS)). In some cases, the first group of search space sets is activated based on the SCell being activated, and the first group of search space sets may provide a USS on the SCell. Further, the UE may switch from the first group of search space sets to the second group of search space sets based on the SCell being deactivated, where the second group of search space sets may provide CSS on the PCell and include no search spaces on the SCell. Additionally, or alternatively, search space set group switching may be performed based on one or more activated or dormant bandwidth parts (BWPs). In some cases, an access network entity may trigger search space set group switching using explicit signaling, based on SCell activation/deactivation, based on a timer, or any combinations thereof.

A method for wireless communication at a user equipment (UE) is described. The method may include receiving, a set of multiple groups of search space sets that each identify one or more search spaces of one or more serving cells to be monitored for control information, where the set of multiple groups of search space sets include at least a first group of search space sets and a second group of search space sets, and where two or more serving cells are configured for concurrent communications between the UE and the access network entity, monitoring a first set of search spaces of the first group of search space sets based on resources associated with a first serving cell of the two or more serving cells being activated for communications, and monitoring a second set of search spaces of the second group of search space sets based on the resources associated with the first serving cell being deactivated for communication.

An apparatus for wireless communication at a UE is described. The apparatus may include a processor, memory coupled with the processor, and instructions stored in the memory. The instructions may be executable by the processor to cause the apparatus to receive, a set of multiple groups of search space sets that each identify one or more search spaces of one or more serving cells to be monitored for control information, where the set of multiple groups of search space sets include at least a first group of search space sets and a second group of search space sets, and where two or more serving cells are configured for concurrent communications between the UE and the access network entity, monitor a first set of search spaces of the first group of search space sets based on resources associated with a first serving cell of the two or more serving cells being activated for communications, and monitor a second set of search spaces of the second group of search space sets based on the resources associated with the first serving cell being deactivated for communication.

Another apparatus for wireless communication at a UE is described. The apparatus may include means for receiving, a set of multiple groups of search space sets that each identify one or more search spaces of one or more serving cells to be monitored for control information, where the set of multiple groups of search space sets include at least a first group of search space sets and a second group of search space sets, and where two or more serving cells are configured for concurrent communications between the UE and the access network entity, means for monitoring a first set of search spaces of the first group of search space sets based on resources associated with a first serving cell of the two or more serving cells being activated for communications, and means for monitoring a second set of search spaces of the second group of search space sets based on the resources associated with the first serving cell being deactivated for communication.

A non-transitory computer-readable medium storing code for wireless communication at a UE is described. The code may include instructions executable by a processor to receive, a set of multiple groups of search space sets that each identify one or more search spaces of one or more serving cells to be monitored for control information, where the set of multiple groups of search space sets include at least a first group of search space sets and a second group of search space sets, and where two or more serving cells are configured for concurrent communications between the UE and the access network entity, monitor a first set of search spaces of the first group of search space sets based on resources associated with a first serving cell of the two or more serving cells being activated for communications, and monitor a second set of search spaces of the second group of search space sets based on the resources associated with the first serving cell being deactivated for communication.

In some examples of the method, apparatuses, and non-transitory computer-readable medium described herein, the UE switches between monitoring the first set of search spaces and monitoring the second set of search spaces based on a secondary SCell activation or deactivation command. In some examples of the method, apparatuses, and non-transitory computer-readable medium described herein, the secondary SCell activation or deactivation command provides a time reference and the UE switches between monitoring the first set of search spaces and monitoring the second set of search spaces within a predetermined time after the time reference. In some examples of the method, apparatuses, and non-transitory computer-readable medium described herein, the UE switches between monitoring the first set of search spaces and monitoring the second set of search spaces based on a timer associated with one or more of the first set of search spaces or the second set of search spaces.

Some examples of the method, apparatuses, and non-transitory computer-readable medium described herein may further include operations, features, means, or instructions for receiving a first message to switch to an active bandwidth part (BWP) associated with the first serving cell, and where the first set of search spaces may be monitored for control information responsive to the first message and receiving a second message that indicates to switch away from the active BWP associated with the first serving cell, and where the second set of search spaces may be monitored for control information responsive to the second message.

In some examples of the method, apparatuses, and non-transitory computer-readable medium described herein, the first set of search spaces may be monitored for control information starting at a predetermined time after the first message. Some examples of the method, apparatuses, and non-transitory computer-readable medium described herein may further include operations, features, means, or instructions for receiving a first message to activate communications using the first serving cell, and where the first set of search spaces are monitored for control information responsive to the first message.

Some examples of the method, apparatuses, and non-transitory computer-readable medium described herein may further include operations, features, means, or instructions for receiving a second message to deactivate communications using the first serving cell, and where the second set of search spaces are monitored for control information responsive to the second message. In some examples of the method, apparatuses, and non-transitory computer-readable medium described herein, the first set of search spaces includes separate search spaces for each serving cell of the two or more serving cells, and the second set of search spaces includes separate search spaces for each cell of the two or more serving cells and the search spaces are for one or more downlink control information (DCI) formats scheduling shared channel transmissions, control channel transmissions, or combinations thereof.

In some examples of the method, apparatuses, and non-transitory computer-readable medium described herein, the first set of search spaces includes common search spaces for a primary cell (PCell) or a primary secondary cell (SCell), and the second set of search spaces includes UE-specific search spaces for a secondary SCell for non-fallback DCI formats. In some examples of the method, apparatuses, and non-transitory computer-readable medium described herein, the first set of search spaces includes common search spaces or UE-specific search spaces for a primary cell (PCell) or a primary secondary cell (SCell) for fallback DCI formats, and the second set of search spaces includes UE-specific search spaces for a secondary SCell for non-fallback DCI formats. In some examples of the method, apparatuses, and non-transitory computer-readable medium described herein, the first set of search spaces includes common search spaces or UE-specific search spaces for a primary cell (PCell) or a primary secondary cell (SCell) for fallback or non-fallback DCI formats, and the second set of search spaces includes UE-specific search spaces for a secondary SCell for non-fallback DCI formats.

In some examples of the method, apparatuses, and non-transitory computer-readable medium described herein, the UE switches between monitoring the first set of search spaces and monitoring the second set of search spaces based on an explicit trigger from the access network entity. In some examples of the method, apparatuses, and non-transitory computer-readable medium described herein, the explicit trigger includes a flag bit in a DCI transmission or a DCI transmission in a specific search space of a monitored search space set.

A method for wireless communication at an access network entity is described. The method may include transmitting configuration information for a set of multiple groups of search space sets that each identify one or more search spaces of one or more serving cells to be monitored by a UE for control information, where the set of multiple groups of search space sets include at least a first group of search space sets and a second group of search space sets, and where two or more serving cells are configured for concurrent communications between the UE and the access network entity, transmitting control information to the UE via a first control information resource in a first set of search spaces of the first group of search space sets based on resources associated with a first serving cell of the two or more serving cells being activated for communications, and transmitting control information to the UE via a second control information resource in a second set of search spaces of the second group of search space sets based on the resources associated with the first serving cell being deactivated for communication.

An apparatus for wireless communication at an access network entity is described. The apparatus may include a processor, memory coupled with the processor, and instructions stored in the memory. The instructions may be executable by the processor to cause the apparatus to transmit configuration information for a set of multiple groups of search space sets that each identify one or more search spaces of one or more serving cells to be monitored by a UE for control information, where the set of multiple groups of search space sets include at least a first group of search space sets and a second group of search space sets, and where two or more serving cells are configured for concurrent communications between the UE and the access network entity, transmit control information to the UE via a first control information resource in a first set of search spaces of the first group of search space sets based on resources associated with a first serving cell of the two or more serving cells being activated for communications, and transmit control information to the UE via a second control information resource in a second set of search spaces of the second group of search space sets based on the resources associated with the first serving cell being deactivated for communication.

Another apparatus for wireless communication at an access network entity is described. The apparatus may include means for transmitting configuration information for a set of multiple groups of search space sets that each identify one or more search spaces of one or more serving cells to be monitored by a UE for control information, where the set of multiple groups of search space sets include at least a first group of search space sets and a second group of search space sets, and where two or more serving cells are configured for concurrent communications between the UE and the access network entity, means for transmitting control information to the UE via a first control information resource in a first set of search spaces of the first group of search space sets based on resources associated with a first serving cell of the two or more serving cells being activated for communications, and means for transmitting control information to the UE via a second control information resource in a second set of search spaces of the second group of search space sets based on the resources associated with the first serving cell being deactivated for communication.

A non-transitory computer-readable medium storing code for wireless communication at an access network entity is described. The code may include instructions executable by a processor to transmit configuration information for a set of multiple groups of search space sets that each identify one or more search spaces of one or more serving cells to be monitored by a UE for control information, where the set of multiple groups of search space sets include at least a first group of search space sets and a second group of search space sets, and where two or more serving cells are configured for concurrent communications between the UE and the access network entity, transmit control information to the UE via a first control information resource in a first set of search spaces of the first group of search space sets based on resources associated with a first serving cell of the two or more serving cells being activated for communications, and transmit control information to the UE via a second control information resource in a second set of search spaces of the second group of search space sets based on the resources associated with the first serving cell being deactivated for communication.

In some examples of the method, apparatuses, and non-transitory computer-readable medium described herein, the access network entity switches between transmitting control information via the first set of search spaces or the second set of search spaces based on a secondary cell activation or deactivation. In some examples of the method, apparatuses, and non-transitory computer-readable medium described herein, the access network entity switches between transmitting control information via the first set of search spaces or the second set of search spaces based on a timer associated with one or more of the first set of search spaces or the second set of search spaces.

Some examples of the method, apparatuses, and non-transitory computer-readable medium described herein may further include operations, features, means, or instructions for transmitting a first message to switch to an active bandwidth part (BWP) associated with the first serving cell, and where the first control information resource may be selected from the first set of search spaces responsive to the first message and transmitting a second message that indicates to switch away from the active BWP associated with the first serving cell, and where the second control information resource may be selected from the second set of search spaces responsive to the second message.

Some examples of the method, apparatuses, and non-transitory computer-readable medium described herein may further include operations, features, means, or instructions for transmitting a first message to activate communications using the first serving cell, and where the first control information resource may be selected from the first set of search spaces responsive to the first message and transmitting a second message to deactivate communications using the first serving cell, and the second control information resource may be selected from the second set of search spaces responsive to the second message.

In some examples of the method, apparatuses, and non-transitory computer-readable medium described herein, the first set of search spaces includes separate search spaces for each serving cell of the two or more serving cells and the second set of search spaces includes separate search spaces for each cell of the two or more serving cells. In some examples of the method, apparatuses, and non-transitory computer-readable medium described herein, the first set of search spaces includes common search spaces for a primary cell (PCell) or a primary secondary cell (SCell), and the second set of search spaces includes UE-specific search spaces for a secondary SCell for non-fallback DCI formats. In some examples of the method, apparatuses, and non-transitory computer-readable medium described herein, the first set of search spaces includes common search spaces or UE-specific search spaces for a primary cell (PCell) or a primary secondary cell (SCell) for fallback DCI formats, and the second set of search spaces includes UE-specific search spaces for a secondary SCell for non-fallback DCI formats. In some examples of the method, apparatuses, and non-transitory computer-readable medium described herein, the first set of search spaces includes common search spaces or UE-specific search spaces for a primary cell (PCell) or a primary secondary cell (SCell) for fallback or non-fallback DCI formats, and the second set of search spaces includes UE-specific search spaces for a secondary SCell for non-fallback DCI formats.

Some examples of the method, apparatuses, and non-transitory computer-readable medium described herein may further include operations, features, means, or instructions for transmitting an explicit trigger to indicate to the UE to switch between monitoring the first set of search spaces and monitoring the second set of search spaces. In some examples of the method, apparatuses, and non-transitory computer-readable medium described herein, the explicit trigger includes a flag bit in a DCI transmission or a DCI transmission in a specific search space of a monitored search space set.

DETAILED DESCRIPTION

Figure 1:
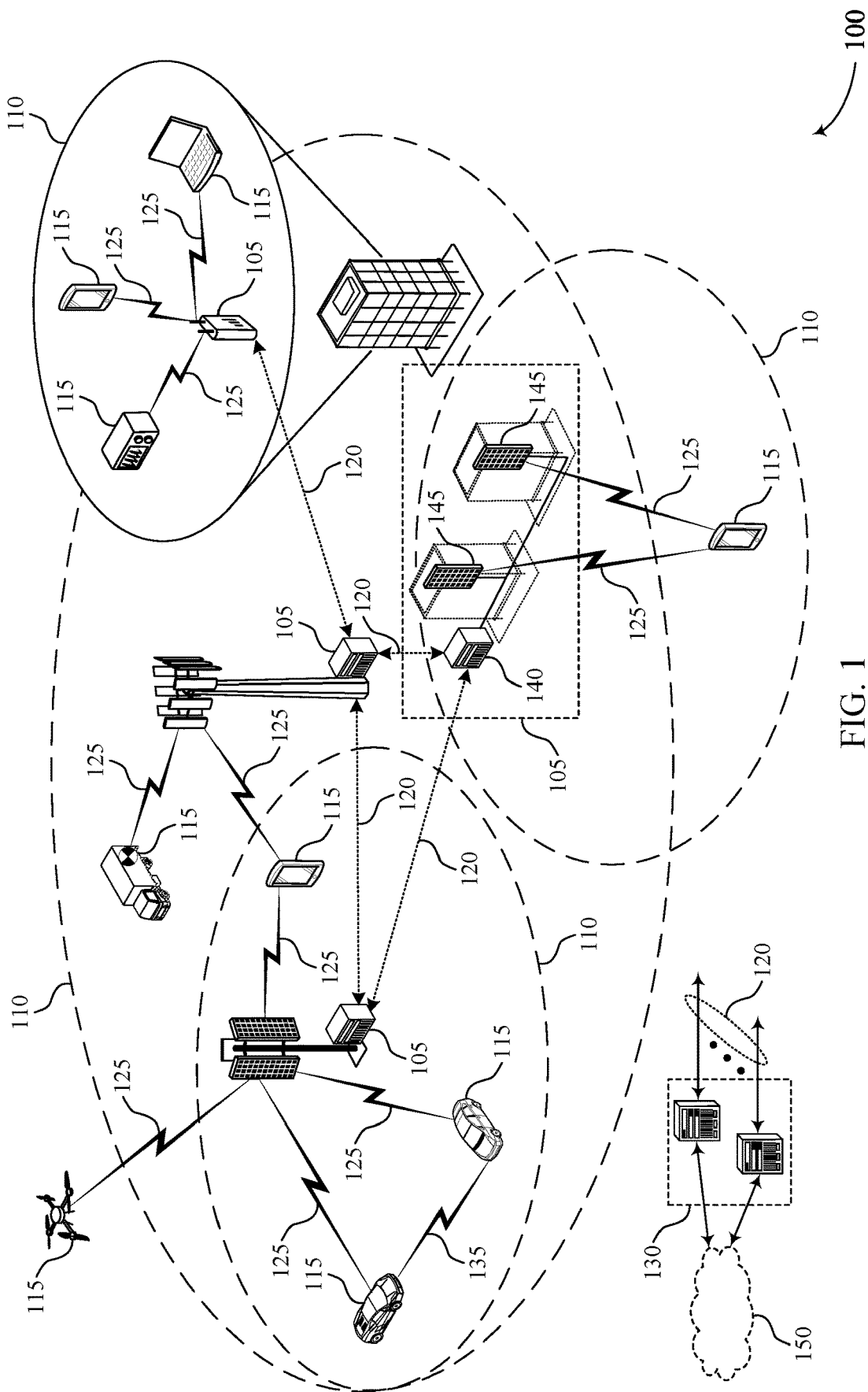
FIG. 1 illustrates an example of a wireless communications system that supports search space set group switching for cross-carrier scheduling in accordance with aspects of the present disclosure.

In some wireless communications systems, multiple serving cells, or component carriers (CCs), may be configured according to carrier aggregation (CA) techniques for concurrent communications between a user equipment (UE) and a base station or access network entity. When multiple serving cells are present, control information may be provided in one of the serving cells that provides a resource allocation for one or multiple of the serving cells. In some cases, cross-carrier scheduling may be provided in which downlink control information (DCI) provided in a control channel (e.g., a physical downlink control channel (PDCCH)) of a secondary cell (SCell) may schedule a downlink shared channel (e.g., a physical downlink shared channel (PDSCH)) or an uplink shared channel (e.g., a physical uplink shared channel (PUSCH)) transmission on a primary cell (PCell). In some cases, multiple SCells may be present, and DCI on a secondary SCell (sSCell) may schedule a PDSCH or PUSCH on a primary SCell (PSCell). In some cases, a PCell or PSCell may have uplink and downlink resources, and a SCell or sSCell may not have uplink resources (i.e., may be a downlink-only carrier).

A UE that is configured with multiple serving cells may monitor for DCI by blind decoding multiple available DCI candidates in one or more search spaces that may contain DCI. Such search spaces may include a common search space (CSS) and a UE-specific search space (USS). Further, DCI may be provided in a number of different formats, including fallback formats (e.g., DCI formats 0_0, 1_0), and non-fallback formats (e.g., DCI formats 0_1, 1_1, 0_2, 1_2). When monitoring a search space for multiple different DCI formats, a number of blind decodes performed by the UE may increase, which also increases usage of processing resources and power at the UE. In some cases, in order to provide for simplified UE implementation or enhanced network flexibility, different alternatives may be selected related to DCI formats that a UE may be configured to monitor. In a first alternative, a UE may not be configured to monitor DCI formats 0_1, 1_1, 0_2, 1_2 (i.e., non-fallback DCI formats) on PCell/PSCell USS set(s), and can be configured to monitor them only on the sSCell USS set(s). This first alternative thus allows for a relatively simple UE implementation, but the network is restricted in the scheduling DCIs that may be provided on different cells. In a second alternative, a UE may be configured to monitor DCI formats 0_1/1_1/0_2/1_2 on PCell/PSCell USS set(s), and/or on sSCell USS set(s). This second alternative may provide enhanced network flexibility, but can result in a more complex UE implementation. In accordance with various aspects of the present disclosure, multiple groups of search space sets may be configured at a UE, which may allow less complex UE implementation and also provide network flexibility.

Various described techniques provide for configuration and switching between multiple groups of search space sets based on activated serving cells or activated resources for one or more serving cells. In some cases, an access network entity may configure a UE for carrier aggregation using multiple different serving cells including a PCell and one or more SCells. In some cases, the access network entity may configure multiple groups of search space sets, including a first group of search space sets and a second group of search space sets, where the UE monitors for DCI in an activated search space set group (e.g., using a CSS and a USS). In some cases, the groups of search space sets can be provided by a direct higher layer parameter (e.g., groups of search space sets), or by an indirect parameter (e.g., a search space set group index in each search space set configuration). In the former case, two groups may be configured where each group contains one or multiple search space sets. In the latter case, a group itself may not be configured, but for each search space set group an index of a group may be provided and, based on this, the UE may determine which search space set belongs to which group. As used herein, one or more groups of search space sets may referred to interchangeably as one or more search space set groups.

In some cases, the first group of search space sets is activated based on the SCell being activated, and the first group of search space sets may provide a USS on the SCell. Further, the UE may switch from the first group of search space sets to the second group of search space sets based on the SCell being deactivated, where the second group of search space sets may provide CSS on the PCell and include no search spaces on the SCell. Additionally, or alternatively, search space set group switching may be performed based on one or more activated bandwidth parts (BWPs). In some cases, an access network entity may trigger search space set group switching using explicit signaling, based on SCell activation/deactivation, based on a timer, or any combinations thereof.

Aspects of the disclosure are initially described in the context of wireless communications systems. Aspects of the disclosure are further described in the context of resource diagrams and a process flow. Aspects of the disclosure are further illustrated by and described with reference to apparatus diagrams, system diagrams, and flowcharts that relate to search space set group switching for cross-carrier scheduling.

FIG. 1 illustrates an example of a wireless communications system 100 that supports search space set group switching for cross-carrier scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both)

may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may configure a UE 115 for carrier aggregation using multiple different serving cells including a PCell and one or more SCells. In some cases, the base station 105 may configure multiple groups of search space sets, including a first group of search space sets and a second group of search space sets, where the UE 115 monitors for DCI in an activated search space set group (e.g., using a CSS and a USS). In some cases, the first group of search space sets is activated based on the SCell being activated, and the first group of search space sets may provide a USS on the SCell. Further, the UE 115 may switch from the first group of search space sets to the second group of search space sets based on the SCell being deactivated, where the second group of search space sets may provide CSS on the PCell and include no search spaces on the SCell. Additionally, or alternatively, search space set group switching may be performed based on one or more activated BWPs. In some cases, a base station 105 may trigger search space set group switching using explicit signaling, based on SCell activation/deactivation, based on a timer, or any combinations thereof.

Figure 2:
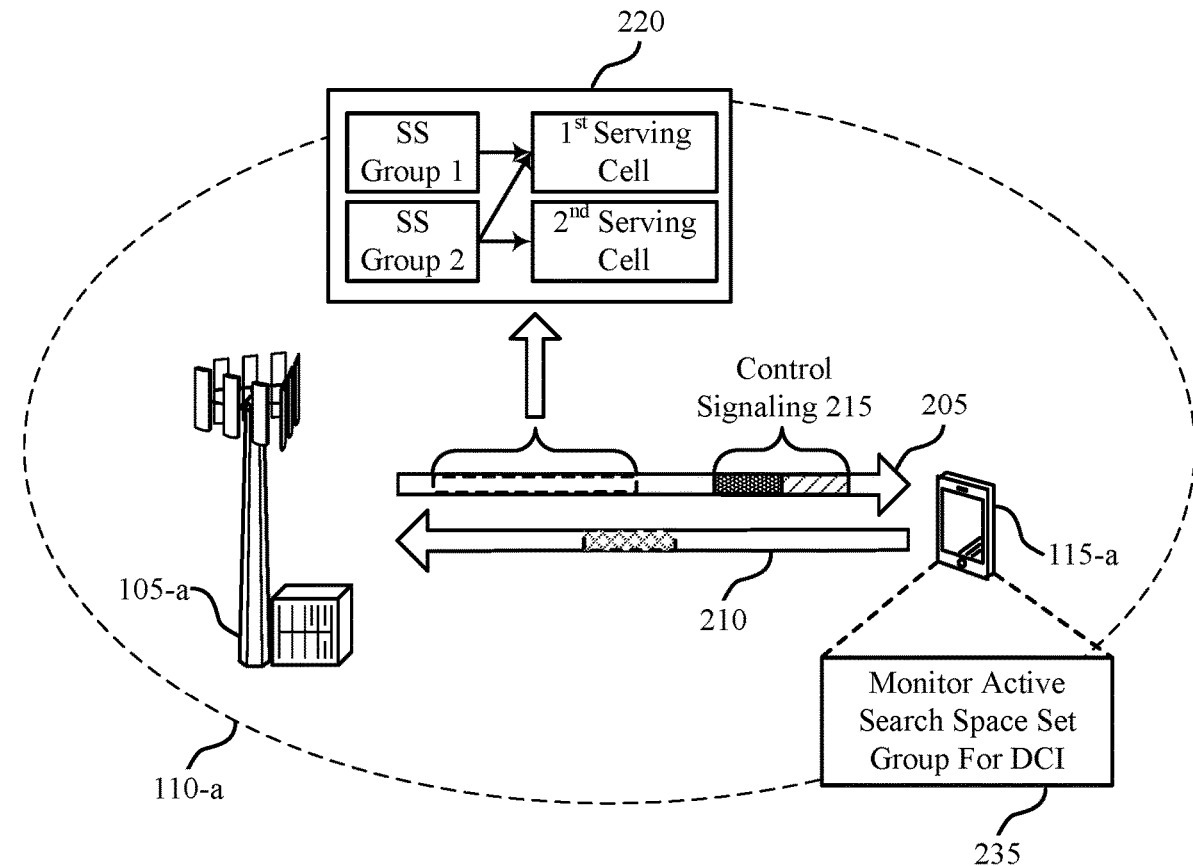
FIG. 2 illustrates an example of a portion of a wireless communications system that supports search space set group switching for cross-carrier scheduling in accordance with aspects of the present disclosure.

FIG. 2 illustrates an example of a wireless communications system 200 that supports search space set group switching for cross-carrier scheduling in accordance with aspects of the present disclosure. In some examples, wireless communications system 200 may implement aspects of wireless communication system 100 and may include UE 115-a and a base station 105-a with coverage area 110-a, which may be examples of UEs 115 and base stations 105 as described with reference to FIG. 1.

In some examples, base station 105-a may configure multiple search space set groups, and the UE 115-a may monitor for DCI based on an activated search space set group. For example, the UE 115-*a* may monitor a specific search space set group for DCI in response to the specific search space set group being activated and may refrain from monitoring the specific search space set group for DCI in response to it being deactivated. For example, base station 105-*a* may communicate with UE 115-*a* by transmitting control signaling or data (e.g., a broadcast message, a unicast message, or both) via downlink communication link 205, receiving control signaling or data via uplink communication link 210, or both. In some cases, base station 105-*a* may transmit control signaling 215 to UE 115-*a* that may provide a search space set group configuration for the UE 115-*a* to enable or disable monitoring of USS and CSS on one or multiple cells. In some cases, a first search space set group and a second search space set group may be configured, as indicated at 220, that may provide CSS and USS information for one or multiple serving cells. In some cases, the first search space set group may provide search space sets (e.g., CSS) for a first serving cell, where the search space sets provide DCI candidates on a PDCCH of the first serving cell. In some cases, the second search space set group may provide search space sets (e.g., CSS, USS) for the first serving cell and the second serving cell, where the search space sets provide DCI candidates on PDCCHs of both the first serving cell and second serving cell.

In some cases, UE 115-*a* may monitor one or more channels for signaling from base station 105-*a* in accordance with the activated search space set. In some cases, the UE 115-*a* may switch between the first search space set group and the second search space set group based on a SCell activation or deactivation 230. Based on the activated or deactivated cells, or resources associated with a cell (e.g., a BWP, as discussed herein), the UE 115-*a* may monitor the active search space set group for DCI, as indicated at 235. In some cases, the UE 115-*a* may transmit a feedback message 240 to the base station 105-*a* that indicates feedback related to successful receipt of one or more DCI transmissions. In some cases, the search space set group configuration 225 may be provided in RRC signaling or in a MAC control element (MAC-CE) by the base station 105-*a*, and the SCell activation or deactivation 230 may be provided in DCI.

Figure 3:
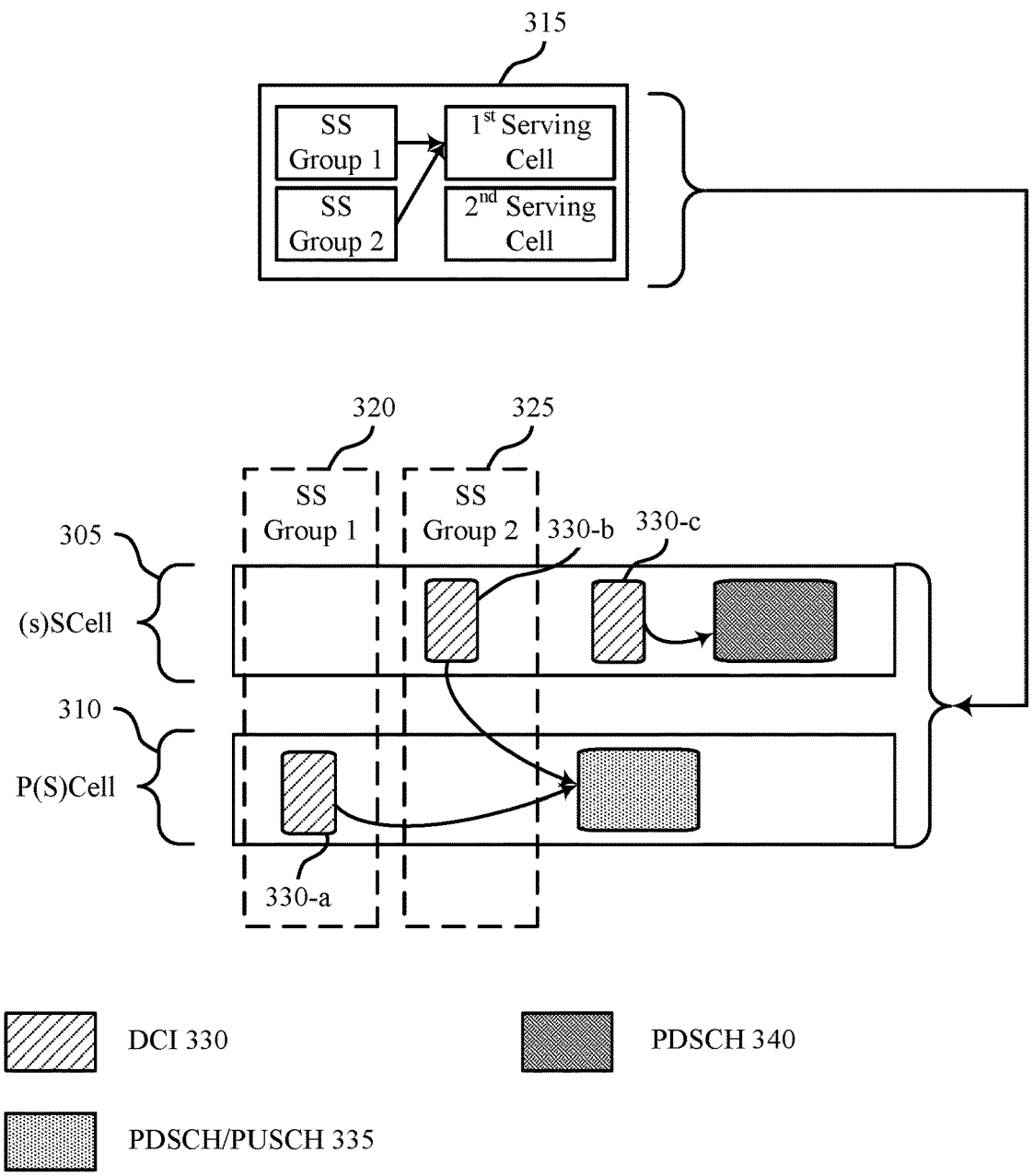
FIGS. 3 through 7 illustrate examples of resource diagrams that support search space set group switching for cross-carrier scheduling in accordance with aspects of the present disclosure.

FIG. 3 illustrates an example of a resource diagram 300 that supports search space set group switching for cross-carrier scheduling in accordance with aspects of the present disclosure. In some examples, resource diagram 300 may implement aspects of wireless communication system 100 and wireless communications system 200. For example, resource diagram 300 may be implemented by a UE 115 and a base station 105 as described with reference to FIGS. 1 and 2.

In this example, a SCell 305 (or sSCell) may be configured at a UE, along with a PCell 310 (or PSCell). Further, the UE may be configured with multiple different search space set groups by configuration 315, which may include a first search space set group 320 and a second search space set group 325. In this example, the first search space set group 320 may include search spaces in a PDCCH of the PCell 310 that may include a DCI that schedules PDSCH/PUSCH 335 resources on the PCell 310. The UE may monitor the PCell 310 for DCI 330-*a* based on the first search space set group 320 being activated by the base station. In other cases, the second search space set group 325 may be activated, and may provide cross-carrier scheduling for the PDSCH/PUSCH 335 resources on the PCell 310 via DCI 330-*b*. Additionally, the SCell 305 may include a set of PDCCH candidates, and the set of PDCCH candidates may include one or separate USSs that may be monitored by the UE. In some cases, a USS may include DCI 330-*c* that may schedule resources for a PDSCH 340 on the SCell 305. In some cases, a same USS or separate USS may be monitored for DCI that may schedule resources for a PDSCH on the SCell 305 (e.g., self-scheduling with a different CIF value) or another SCell (e.g., cross-carrier scheduling from the SCell 305 to another SCell). Further examples of CSS and USS configurations for fallback and non-fallback DCI, and switching between search space set groups, are discussed herein with reference to FIGS. 4 through 7.

Figure 4:
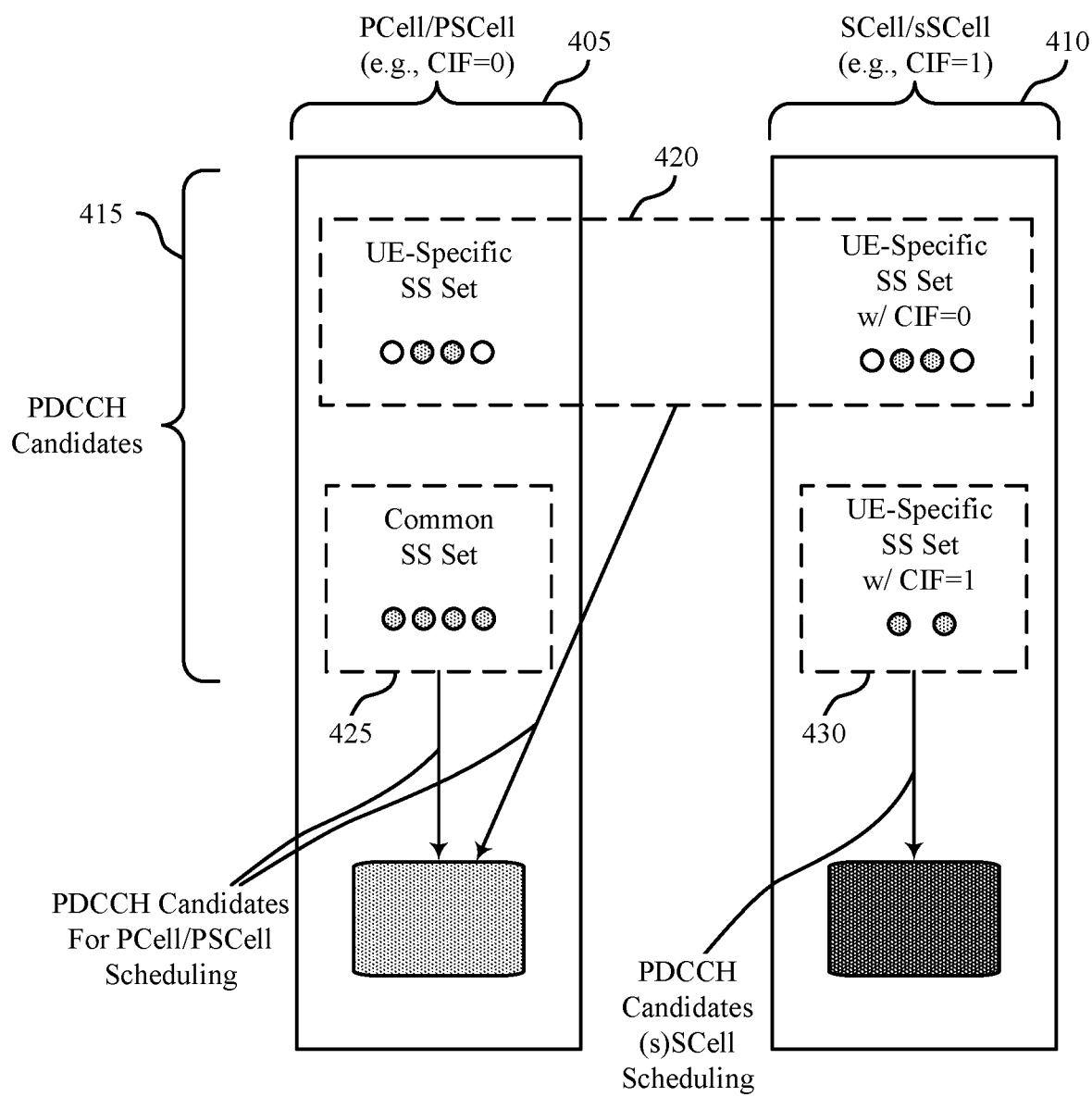

FIG. 4 illustrates an example of a resource diagram 400 that supports search space set group switching for cross-carrier scheduling in accordance with aspects of the present disclosure. In some examples, resource diagram 400 may implement aspects of wireless communication system 100 and wireless communications system 200. For example, resource diagram 400 may be implemented by a UE 115 and a base station 105 as described with reference to FIGS. 1 and 2.

In this example, a PCell/PSCell 405 and a SCell/sSCell 410 may be configured at a UE. The PCell/PSCell 405 may have an associated carrier indicator field (CIF) set to zero (i.e., CIF=0) and a SCell/sSCell 410 may have a CIF=1. The CIF and associated values are one example of indicating the cell associated with a search space, and in other examples a SCell/sSCell 410 may have CIF=0 and a PCell/PSCell 405 may have CIF=1, or the indicator may be configurable by RRC signaling. The UE may have a number of PDCCH candidates 415 that are configured as part of a search space set. In this example, the PDCCH candidates 415 may include a USS 420 that includes a set of candidates in both the PCell/PSCell 405 and the SCell/sSCell 410, a CSS 425 on the PCell/PSCell 405, and a USS 430 on the SCell/sSCell 410. In this example, the USS 420 provides a set of search space candidates on the SCell/sSCell 410 that may be configured with CIF=0, which indicates that associated DCI schedules PDSCH/PUSCH 435 for the PCell/PSCell 405. Further, the USS 430 may include candidates that have a CIF=1 (or other indicator of which cell is associated with the search space), which indicates that associated DCI schedules PDSCH/PUSCH 440 for the SCell/sSCell 410. In accordance with various aspects of the present disclosure, in some cases a UE may be configured with multiple different search space set groups, and a particular group may be selected that switches UE PDCCH candidate monitoring. Such techniques may provide for UE implementation with relatively lower processing requirements for performing blind decodes while also allowing for enhanced network flexibility to perform cross-carrier scheduling. Such techniques may thus reduce UE power consumption, and may also provide enhanced network efficiency and throughput by allowing a base station to use a SCell/sSCell to provide DCI that schedules PDSCH/PUSCH of different cell, and allowing the PCell/PSCell resources to be used for other purposes.

Figure 5:
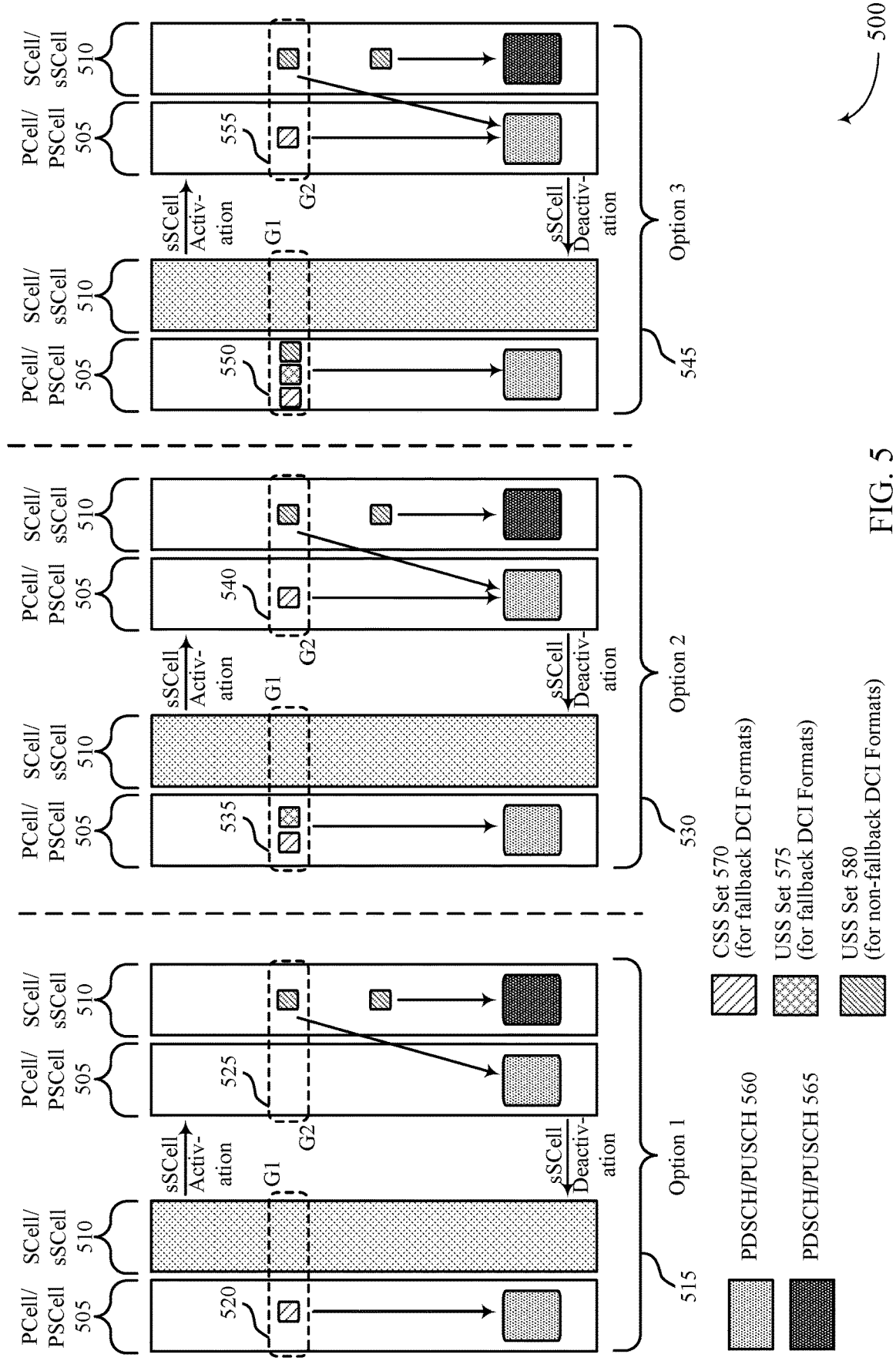

FIG. 5 illustrates an example of a resource diagram 500 that supports search space set group switching for cross-carrier scheduling in accordance with aspects of the present disclosure. In some examples, resource diagram 500 may implement aspects of wireless communication system 100 and wireless communications system 200. For example, resource diagram 500 may be implemented by a UE 115 and a base station 105 as described with reference to FIGS. 1 and 2.

In this example, a base station may configure a UE with a PCell/PSCell 505 and an SCell/sSCell 510. While only two serving cells are illustrated and discussed in various examples herein, techniques provided herein may be used for any number of configured serving cells. In this example, multiple different options for search space set configurations are illustrated for purposes of discussion and illustration only, with the understanding that numerous other options are within the scope of the disclosure and may be implemented in accordance with techniques discussed herein. In a first option 515, a first search space set group 520 (G1) may be configured and selected when the SCell/sSCell 510 is deactivated. The first search space set group 520 may include a CSS set 570 for fallback DCI formats on the PCell/PSCell, which may schedule PDSCH/PUSCH 560 on the PCell/PSCell 505. Further, in the first option 515, a second search space set group 525 (G2) may be configured and selected when the SCell/sSCell 510 is activated. The second search space set group 525 may include a USS set 580 for non-fallback DCI formats on the SCell/sSCell 510, which may schedule PDSCH/PUSCH 560 on the PCell/PSCell 505. The SCell/sSCell 510 may also include a USS set 580 that may schedule PDSCH/PUSCH 565 on the SCell/sSCell 510. Using such techniques the base station and UE may configure search space set group switching for cross-carrier scheduling from sSCell to PCell/PSCell based on activation/deactivation of the SCell/sSCell 510.

In a second option 530, a first search space set group 535 (G1) may be configured and selected when the SCell/sSCell 510 is deactivated. The first search space set group 535 may include a CSS set 570 and a USS set 575 that are both for fallback DCI formats on the PCell/PSCell, which may schedule PDSCH/PUSCH 560 on the PCell/PSCell 505. Further, in the second option 530, a second search space set group 540 (G2) may be configured and selected when the SCell/sSCell 510 is activated. The second search space set group 540 may include a CSS set 570 for fallback DCI formats on the PCell/PSCell 505 and a USS set 580 for non-fallback DCI formats on the SCell/sSCell 510, which may schedule PDSCH/PUSCH 560 on the PCell/PSCell 505. The SCell/sSCell 510 may also include a USS set 580 that may schedule PDSCH/PUSCH 565 on the SCell/sSCell 510.

In a third option 545, a first search space set group 550 (G1) may be configured and selected when the SCell/sSCell 510 is deactivated. The first search space set group 550 may include a CSS set 570 and a USS set 575 that are both for fallback DCI formats on the PCell/PSCell, and a USS set 580 for non-fallback DCI formats, which may schedule PDSCH/PUSCH 560 on the PCell/PSCell 505. Further, in the third option 545, a second search space set group 555 (G2) may be configured and selected when the SCell/sSCell 510 is activated. The second search space set group 555 may include a CSS set 570 for fallback DCI formats on the PCell/PSCell 505 and a USS set 580 for non-fallback DCI formats on the SCell/sSCell 510, which may schedule PDSCH/PUSCH 560 on the PCell/PSCell 505. Further, the SCell/sSCell 510 may also include a USS set 580 that may schedule PDSCH/PUSCH 560 on the PCell/PSCell 505. The SCell/sSCell 510 may also include a USS set 580 that may schedule PDSCH/PUSCH 565 on the SCell/sSCell 510.

In some cases, the search space set groups can be provided by a direct higher layer parameter (e.g., search space set groups), or by an indirect parameter (e.g., a search space set group index in each search space set configuration). In the former case, two groups may be configured where each group contains one or multiple search space sets. In the latter case, group itself may not be configured, but for each search space set group an index of a group may be provided and, based on this, the UE acquires which search space set belongs to which group.

In some cases, the base station may provide a trigger for search space set group switching between different groups of search space sets, which may provide for cross-carrier scheduling from SCell/sSCell 510 to PCell/PSCell 505. In some cases, the search space set group switching may be triggered by explicit signaling. For example, a specific DCI (e.g., DCI format 2_0) may have a flag bit to indicate search space set group switching to a UE. In such cases, upon detection of the DCI format with the flag indicating the search space set group switching, the UE switches the search space set group(s) of scheduling cells for PCell/PSCell 505 after a certain time period. In other cases, a DCI detection in a specific search space set indicates the search space set group switching to a UE. In such cases, upon detection of the DCI format within the search space set, the UE switches the search space set group(s) of the scheduling cells for PCell/PSCell 505 after a certain time period (e.g., a certain number of slots).

In some cases, search space set group switching may be triggered by a SCell/sSCell 510 activation/deactivation command. In such cases, SCell/sSCell 510 activation/deactivation is a trigger of search space set group switching and the switching timing reference. For example, a UE may receive (e.g., in a PDSCH) an activation/deactivation command for the SCell/sSCell 510 in slot n. The UE may then apply the search space set group switching in slot n+k (e.g., where $k=k_1+3*N+1$ with $k_1$ corresponding to a PDSCH-to-HARQ timing and N is the number of slots per subframe (the number of slots 3*N corresponds to a 3 ms duration)).

In further, cases, search space set group switching may be triggered by a timer. In such cases, expiration of a particular timer is a trigger of search space set group switching and the switching timing reference. For example, a deactivation timer may be configured (e.g., a sCellDeactivationTimer) for the SCell/sSCell 510 that expires in slot n, and the UE may apply the search space set group switching in slot n+k (e.g., where $k=3*N+1$).

Figure 6:
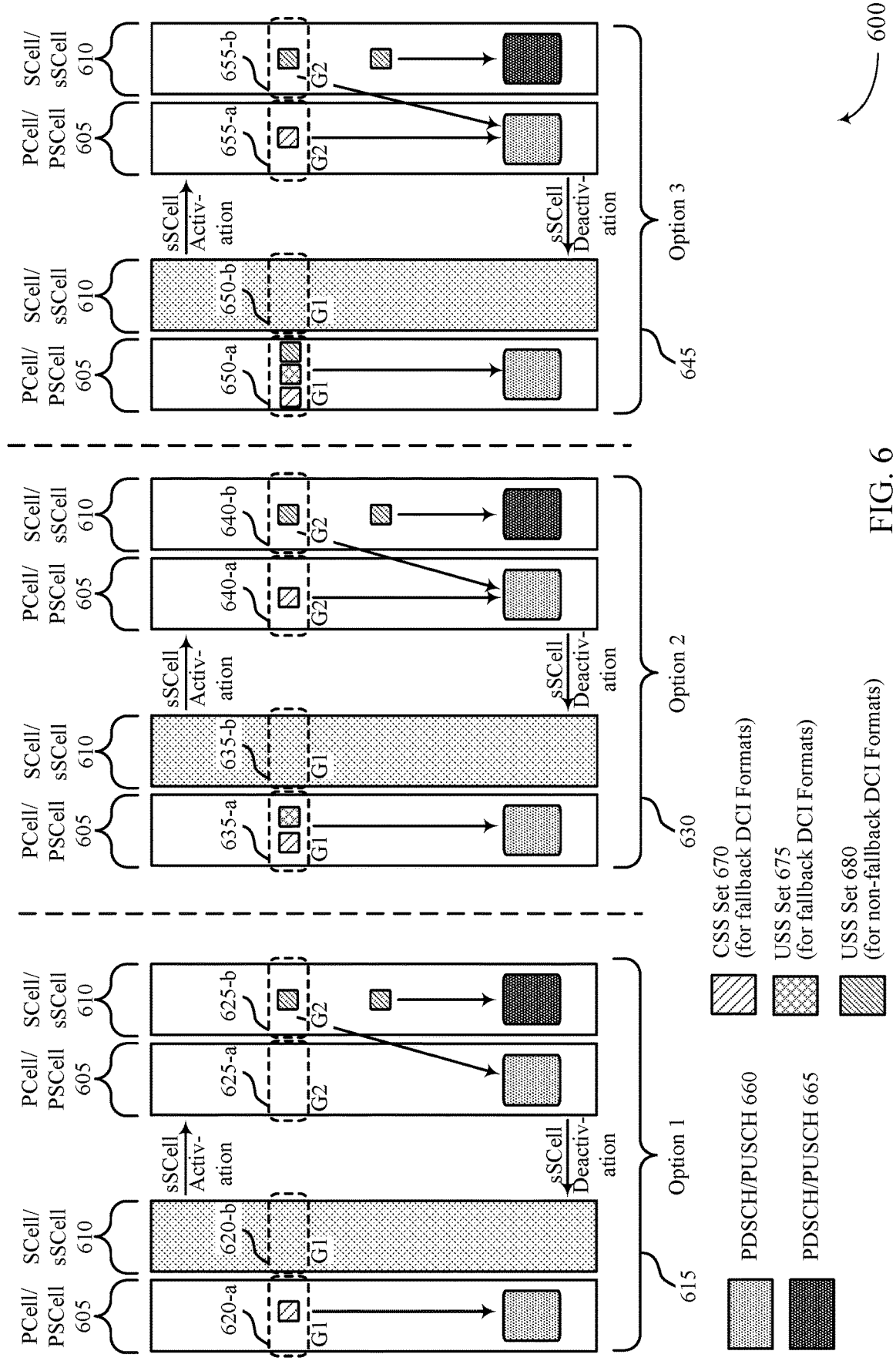

FIG. 6 illustrates another example of a resource diagram 600 that supports search space set group switching for cross-carrier scheduling in accordance with aspects of the present disclosure. In some examples, resource diagram 600 may implement aspects of wireless communication system 100 and wireless communications system 200. For example, resource diagram 600 may be implemented by a UE 115 and a base station 105 as described with reference to FIGS. 1 and 2.

In this example, similarly as discussed with respect to FIG. 5, a base station may configure a UE with a PCell/PSCell 605 and an SCell/sSCell 610. Again, while only two serving cells are illustrated and discussed in various examples herein, techniques provided herein may be used for any number of configured serving cells, and the different options of FIG. 6 are provided for purposes of discussion and illustration only with the understanding that numerous other options are within the scope of the disclosure. In the examples of FIG. 6, similarly as discussed for FIG. 5, search space set group switching may be provided for each of the two cells when the SCell/sSCell 610 is activated/deactivated. In the options illustrated in FIG. 6, when sSCell is activated/deactivated, search space set group switching is carried out on both PCell/PSCell 605 and SCell/sSCell 610 separately. In FIG. 6, options one through three may be realized similarly as in FIG. 5, with a per scheduling cell configuration, and the UE and base station may switch between G1 and G2 per scheduling cell for a scheduled cell.

In such cases, in the first option 615, a first search space set group 620-a for the PCell/PSCell 605 and a first search space group 620-b for the SCell/sSCell 610 (e.g., an empty group) may be configured and selected when the SCell/sSCell 610 is deactivated. The first search space set group 620-a may include a CSS set 670 for fallback DCI formats on the PCell/PSCell, which may schedule PDSCH/PUSCH 660 on the PCell/PSCell 605. Further, in the first option 615, a second search space set group 625-a for the PCell/PSCell 605 and a second search space set group 625-b for the SCell/sSCell 610 may be configured and selected when the SCell/sSCell 610 is activated. The second search space set group 625-b may include a USS set 680 for non-fallback DCI formats on the PSCell/sSCell 610, which may schedule PDSCH/PUSCH 660 on the PCell/PSCell 605. The SCell/sSCell 610 may also include a USS set 680 that may schedule PDSCH/PUSCH 665 on the SCell/sSCell 610. Using such techniques the base station and UE may configure search space set group switching for cross-carrier scheduling from sSCell to PCell/PSCell based on activation/deactivation of the SCell/sSCell 610.

In the second option 630, a first search space set group 635-a for the PCell/PSCell 605, and a first search space set group 635-b for the SCell/sSCell 610, may be configured and selected when the SCell/sSCell 610 is deactivated. The first search space set group 635-a may include a CSS set 670 and a USS set 675 that are both for fallback DCI formats on the PCell/PSCell, which may schedule PDSCH/PUSCH 660 on the PCell/PSCell 605. Further, in the second option 630, a second search space set group 640-a for the PCell/PSCell 605, and a second search space set group 640-b for the SCell/sSCell 610, may be configured and selected when the SCell/sSCell 610 is activated. The second search space set group 640-a may include a CSS set 670 for fallback DCI formats on the PCell/PSCell 605 and second search space set group 640-b may include a USS set 680 for non-fallback DCI formats on the SCell/sSCell 610, which may schedule PDSCH/PUSCH 660 on the PCell/PSCell 605. The SCell/sSCell 610 may also include a USS set 680 that may schedule PDSCH/PUSCH 665 on the SCell/sSCell 610.

In a third option 645, a first search space set group 650-a for the PCell/PSCell 605, and first search space set group 650-b for the SCell/sSCell 610, may be configured and selected when the SCell/sSCell 610 is deactivated. The first search space set group 650-a may include a CSS set 670 and a USS set 675 that are both for fallback DCI formats on the PCell/PSCell, and a USS set 680 for non-fallback DCI formats, which may schedule PDSCH/PUSCH 660 on the PCell/PSCell 605. Further, in the third option 645, a second search space set group 655-a for the PCell/PSCell 605, and a second search space set group 655-b for the SCell/sSCell 610, may be configured and selected when the SCell/sSCell 610 is activated. The second search space set group 655-a may include a CSS set 670 for fallback DCI formats on the PCell/PSCell 605 and second search space set group 655-b may include a USS set 680 for non-fallback DCI formats on the SCell/sSCell 610, which may schedule PDSCH/PUSCH 660 on the PCell/PSCell 605. The SCell/sSCell 610 may also include a USS set 680 that may schedule PDSCH/PUSCH 665 on the SCell/sSCell 610. In some cases, the base station may provide a trigger for search space set group switching between different groups of search space sets, which may provide for cross-carrier scheduling from SCell/sSCell 610 to PCell/PSCell 605, similarly as discussed with respect to FIG. 5.

Figure 7:
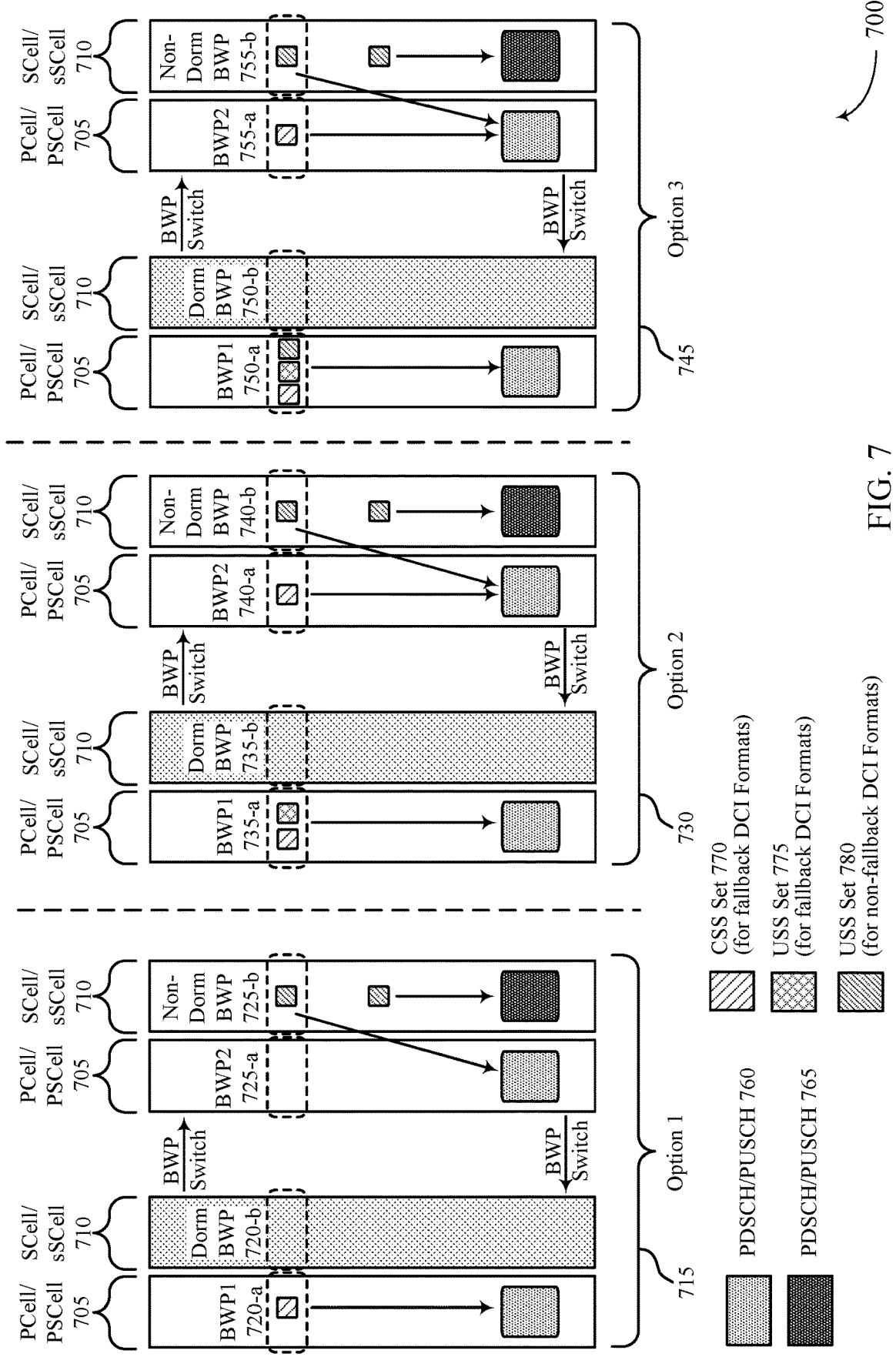

FIG. 7 illustrates an example of a resource diagram 700 that supports search space set group switching for cross-carrier scheduling in accordance with aspects of the present disclosure. In some examples, resource diagram 700 may implement aspects of wireless communication system 100 and wireless communications system 200. For example, resource diagram 700 may be implemented by a UE 115 and a base station 105 as described with reference to FIGS. 1 and 2.

In this example, search space set groups may be configured and switched based on BWP-switching for cross-carrier scheduling from SCell/sSCell 710 to PCell/PSCell 705. In some cases, a UE may be configured with switching to/from multiple different BWP configurations. As illustrated in this example, a "Dorm BWP" may be a dormant BWP, and a "Non-Dorm BWP" may be a non-dormant BWP, where a serving cell may switch a BWP between Dorm BWP and Non-Dorm BWP for the UE. Each BWP configuration may include a PDCCH configuration, which may further include parameters for PDCCH monitoring. Further, in some cases, SCell/sSCell 710 BWP can be dormant BWP where PDCCH is not monitored. In some cases, a dormant BWP indication can be for a set of SCells/sSCells, but for other BWP switching the signal is per cell. Further, in some cases PCell/PSCell cannot be switched to dormant BWP, and only SCells can be switched (e.g., based on a layer one (L1) SCell dormancy indication that is sent on PCell in an explicit information field in DCI indicates switching to/from dormant BWP configured for the SCell(s)). In some aspects, BWP switching may provide different search space set groups for cross-carrier scheduling from SCell/sSCell 710 to PCell/PSCell 705. For example, a dormant BWP indication or BWP-switch for the SCell/sSCell 710 may indicate BWP-switching or search space set group switching for the PCell/PSCell 705. With BWP-switching or dormant BWP indication, the UE switches BWP of the SCell/sSCell 710 after a certain time period (e.g., a defined number of slots). Until the end of the period, the UE switches PDCCH monitoring configurations. Thus, different BWP activations may be associated with different search space set groups for PDCCH monitoring. Again it is noted that while only two serving cells and multiple different options for search space set configurations are illustrated, other options are within the scope of the disclosure and may be implemented in accordance with techniques discussed herein.

In the examples of FIG. 7, search space set group switching may be provided for each of the two cells based on BWP switching. In the options illustrated in FIG. 7, when a BWP switch is performed (e.g., switching BWP, moving a BWP from dormant to non-dormant), search space set group switching is carried out on both PCell/PSCell 705 and SCell/sSCell 710. In FIG. 7, options one through three may be realized similarly as in FIGS. 5 and 6, with a per scheduling cell configuration, and the UE and base station may switch between search space set groups per scheduling cell for a scheduled cell.

In such cases, in the first option 715, a first search space set group 720-a for a first BWP of PCell/PSCell 705 and a first search space group 720-b for the SCell/sSCell 710 may be configured and selected when the SCell/sSCell 710 BWP is dormant. The first search space set group 720-a may include a CSS set 770 for fallback DCI formats on the PCell/PSCell, which may schedule PDSCH/PUSCH 760 on the PCell/PSCell 705. Further, in the first option 715, a second search space set group 725-a for a second BWP of the PCell/PSCell 705 and a second search space set group 725-b for a non-dormant BWP of the SCell/sSCell 710 may be configured and selected when the SCell/sSCell 710 BWP is activated. The second search space set group 725-*b* may include a USS set 780 for non-fallback DCI formats on the PSCell/sSCell 710, which may schedule PDSCH/PUSCH 760 on the PCell/PSCell 705. The SCell/sSCell 710 may also include a USS set 780 that may schedule PDSCH/PUSCH 765 on the SCell/sSCell 710. Using such techniques the base station and UE may configure search space set group switching for cross-carrier scheduling from sSCell to PCell/PSCell based on BWP switching.

In the second option 730, a first search space set group 735-*a* for a first BWP for the PCell/PSCell 705, and a first search space set group 735-*b* for the SCell/sSCell 710, may be configured and selected when the SCell/sSCell 710 BWP is dormant. The first search space set group 735-*a* may include a CSS set 770 and a USS set 775 that are both for fallback DCI formats on the PCell/PSCell, which may schedule PDSCH/PUSCH 760 on the PCell/PSCell 705. Further, in the second option 730, a second search space set group 740-*a* for a second BWP of the PCell/PSCell 705, and a second search space set group 740-*b* for a non-dormant BWP of the SCell/sSCell 710, may be configured and selected when the SCell/sSCell 710 BWP is activated. The second search space set group 740-*a* may include a CSS set 770 for fallback DCI formats on the PCell/PSCell 705 and second search space set group 740-*b* may include a USS set 780 for non-fallback DCI formats on the SCell/sSCell 710, which may schedule PDSCH/PUSCH 760 on the PCell/PSCell 705. The SCell/sSCell 710 may also include a USS set 780 that may schedule PDSCH/PUSCH 765 on the SCell/sSCell 710.

In a third option 745, a first search space set group 750-*a* for a first BWP for the PCell/PSCell 705, and first search space set group 750-*b* for the SCell/sSCell 710, may be configured and selected when the SCell/sSCell 710 BWP is dormant. The first search space set group 750-*a* may include a CSS set 770 and a USS set 775 that are both for fallback DCI formats on the PCell/PSCell, and a USS set 780 for non-fallback DCI formats, which may schedule PDSCH/PUSCH 760 on the PCell/PSCell 705. Further, in the third option 745, a second search space set group 755-*a* for a second BWP of the PCell/PSCell 705, and a second search space set group 755-*b* for a non-dormant BWP of the SCell/sSCell 710, may be configured and selected when the SCell/sSCell 710 BWP is activated. The second search space set group 755-*a* may include a CSS set 770 for fallback DCI formats on the PCell/PSCell 705 and second search space set group 755-*b* may include a USS set 780 for non-fallback DCI formats on the SCell/sSCell 710, which may schedule PDSCH/PUSCH 760 on the PCell/PSCell 705. The SCell/sSCell 710 may also include a USS set 780 that may schedule PDSCH/PUSCH 765 on the SCell/sSCell 710. In some cases, the base station may provide a trigger for BWP switching and for switching between different groups of search space sets, which may provide for cross-carrier scheduling from SCell/sSCell 710 to PCell/PSCell 705.

Figure 8:
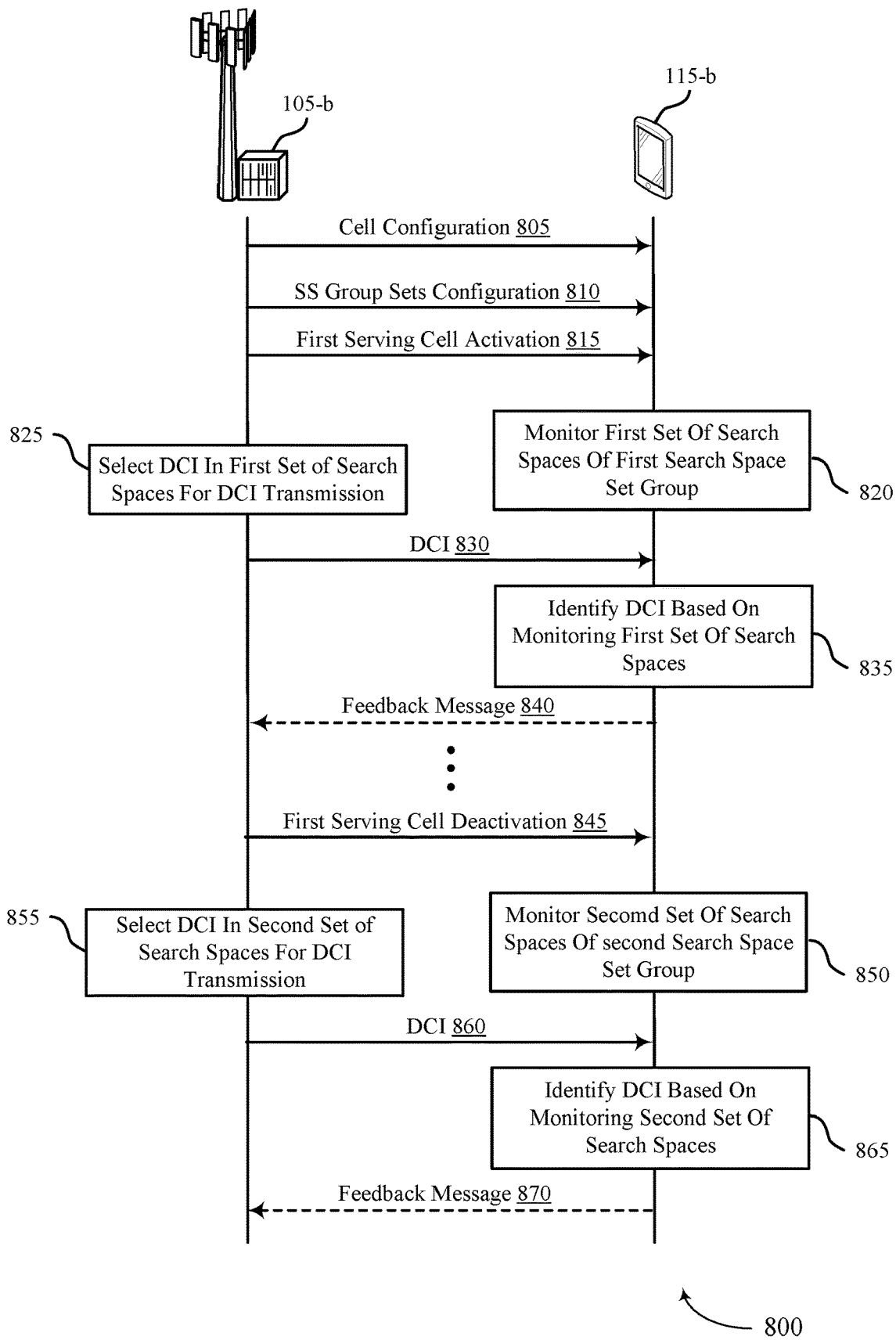
FIG. 8 illustrates an example of a process flow that supports search space set group switching for cross-carrier scheduling in accordance with aspects of the present disclosure.

FIG. 8 illustrates an example of a process flow 800 that supports search space set group switching for cross-carrier scheduling in accordance with aspects of the present disclosure. In some examples, process flow 800 may implement aspects of wireless communications system 100, wireless communications system 200, and resource diagrams 300 through 700. The process flow 800 may illustrate an example of a base station 105-*b* and a UE 115-*b* and providing DCI in accordance with configured search space set groups. Alternative examples of the following may be implemented, where some processes are performed in a different order than described or are not performed. In some cases, processes may include additional features not mentioned below, or further processes may be added.

At 805, base station 105-*b* may transmit a configuration to UE 115-*b* identifying a cell configuration for two or more serving cells. In some cases, the configuration may establish a PCell and one or more SCells for communications between the UE 115-*b* and the base station 105-*b*.

At 810, the base station 105-*b* may transmit a search space group set configuration to the UE 115-*b*. In some case, the search space group set configuration may configure two or more sets of search space groups that may be selected based on certain conditions or triggering events. In some cases, the search space group set configuration may provide USS and CSS configurations for a PCell and one or more SCells, where different groups of search space sets are provided for different statuses of the PCell and SCell(s), in accordance with techniques as discussed herein.

At 815, the base station 105-*a* may transmit a first serving cell activation to the UE 115-*b*. In some cases, the first serving cell may be a SCell or a sSCell, which may be activated based on the cell configuration. The SCell/sSCell may be activated by transmitting an activation DCI on a PCell, for example. In some cases, the activation of the first serving cell may trigger a switch in the search space set group that is to be used for PDCCH monitoring by the UE 115-*b*, in accordance with techniques as discussed herein.

At 820, the UE 115-*b* may monitor a first set of search spaces of a first search space set group. In some cases, the first set of search spaces may be determined based on the active group of search space sets that is associated with the activated first serving cell. In some cases, the first set of search spaces may include fallback DCI formats, non-fallback DCI formats, or both, for a PCell, PSCell, SCell, sSCell, or combinations thereof.

At 825, the base station 105-*b* may select a DCI in a first search space set for a DCI transmission. In some cases, the selected DCI is from a search space that the UE 115-*b* is to monitor in the configured set of PDCCH candidates associated with the first search space set. At 830, the base station 105-*b* may transmit the DCI to the UE 115-*b*. At 835, the UE 115-*b* may identify the DCI based on the monitoring of the first set of search spaces (e.g., based on blind decoding a number of PDCCH candidates associated with the first set of search spaces).

Optionally, at 840, the UE 115-*b* may transmit a feedback message to the base station 105-*b* that indicates successful or unsuccessful reception of the DCI. The UE 115-*b* and the base station 105-*b* may then communicate based on the received DCI (e.g., based on a PDSCH/PUSCH allocation provided by the DCI). Further, the UE 115-*b* and base station 105-*b* may continue communications based on DCI transmitted in PDCCH candidates for the first serving cell and any other active serving cells.

At 845, the base station 105-*b* may transmit a first serving cell deactivation message to the UE 115-*b*. Based on the first serving cell deactivation, the UE 115-*b* may discontinue communications via the first serving cell (e.g., SCell, PSCell, sSCell communications are discontinued).

At 850, based on the deactivation of the first serving cell, the UE 115-*b* may monitor a second set of search spaces of a second search space set group. In some cases, the second search space set group may be associated with a different serving cell (e.g., a PCell or PSCell) that remains active after deactivation of the first serving cell.

At 855, the base station 105-*b* may select a DCI in the second search space set for a DCI transmission. In some cases, the selected DCI is from a search space that the UE 115-*b* is to monitor in the configured set of PDCCH candidates associated with the second search space set. At 860, the base station 105-*b* may transmit the DCI to the UE 115-*b*. At 865, the UE 115-*b* may identify the DCI based on the monitoring of the second set of search spaces (e.g., based on blind decoding a number of PDCCH candidates associated with the second set of search spaces). Optionally, at 870, the UE 115-*b* may transmit a feedback message to the base station 105-*b* that indicates successful or unsuccessful reception of the DCI. The UE 115-*b* and the base station 105-*b* may then communicate based on the received DCI (e.g., based on a PDSCH/PUSCH allocation provided by the DCI). Further, the UE 115-*b* and base station 105-*b* may continue communications based on DCI transmitted in PDCCH candidates of the second search space set (e.g., until the first serving cell is again activated).

Figure 9:
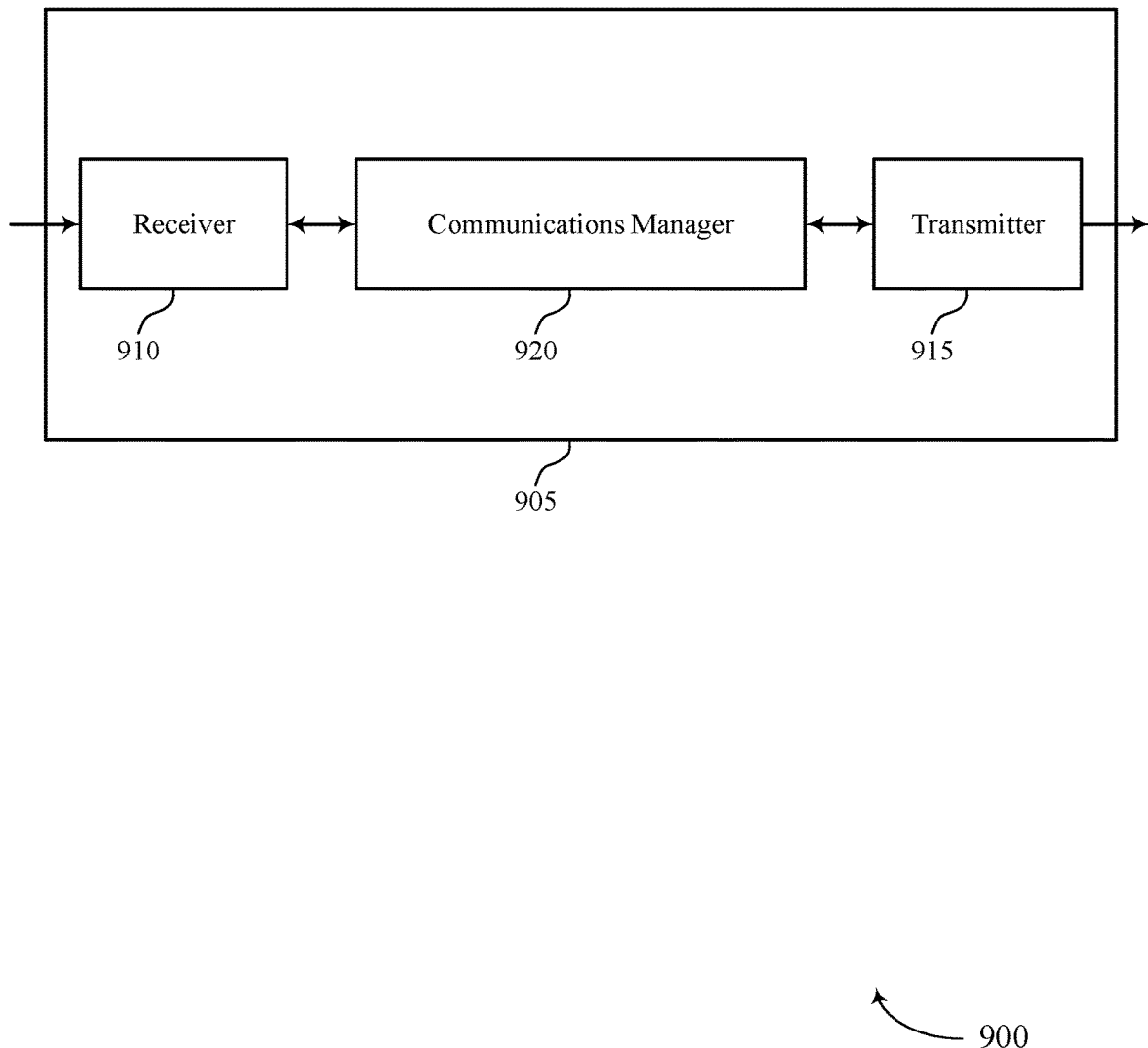
FIGS. 9 and 10 show block diagrams of devices that support search space set group switching for cross-carrier scheduling in accordance with aspects of the present disclosure.

FIG. 9 shows a block diagram 900 of a device 905 that supports search space set group switching for cross-carrier scheduling in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to search space set group switching for cross-carrier scheduling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to search space set group switching for cross-carrier scheduling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of search space set group switching for cross-carrier scheduling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving, from an access network entity, multiple groups of search space sets that each identify one or more search spaces of one or more serving cells to be monitored for control information, where the multiple groups of search space sets include at least a first group of search space sets and a second group of search space sets, and where two or more serving cells are configured for concurrent communications between the UE and the access network entity. The communications manager 920 may be configured as or otherwise support a means for monitoring a first set of search spaces of the first group of search space sets based on resources associated with a first serving cell of the two or more serving cells being activated for communications. The communications manager 920 may be configured as or otherwise support a means for monitoring a second set of search spaces of the second group of search space sets based on the resources associated with the first serving cell being deactivated for communication.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for search space set group switching that provide for reduced processing requirements, reduced power consumption, and more efficient utilization of communication resources.

Figure 10:
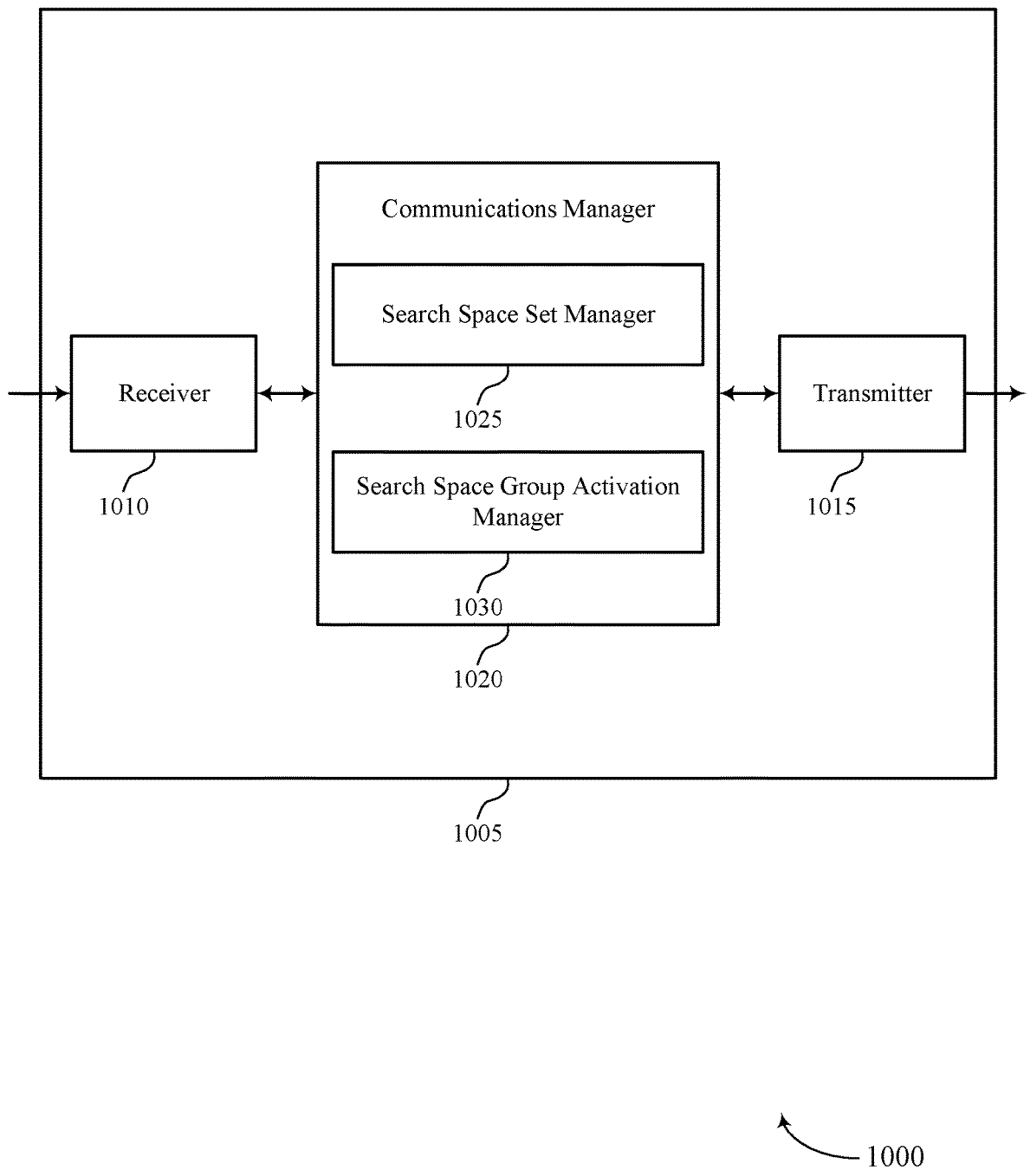

FIG. 10 shows a block diagram 1000 of a device 1005 that supports search space set group switching for cross-carrier scheduling in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to search space set group switching for cross-carrier scheduling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to search space set group switching for cross-carrier scheduling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of search space set group switching for cross-carrier scheduling as described herein. For example, the communications manager 1020 may include a search space set manager 1025 a search space group activation manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The search space set manager 1025 may be configured as or otherwise support a means for receiving, from an access network entity, multiple groups of search space sets that each identify one or more search spaces of one or more serving cells to be monitored for control information, where the multiple groups of search space sets include at least a first group of search space sets and a second group of search space sets, and where two or more serving cells are configured for concurrent communications between the UE and the access network entity. The search space group activation manager 1030 may be configured as or otherwise support a means for monitoring a first set of search spaces of the first group of search space sets based on resources associated with a first serving cell of the two or more serving cells being activated for communications. The search space group activation manager 1030 may be configured as or otherwise support a means for monitoring a second set of search spaces of the second group of search space sets based on the resources associated with the first serving cell being deactivated for communication.

Figure 11:
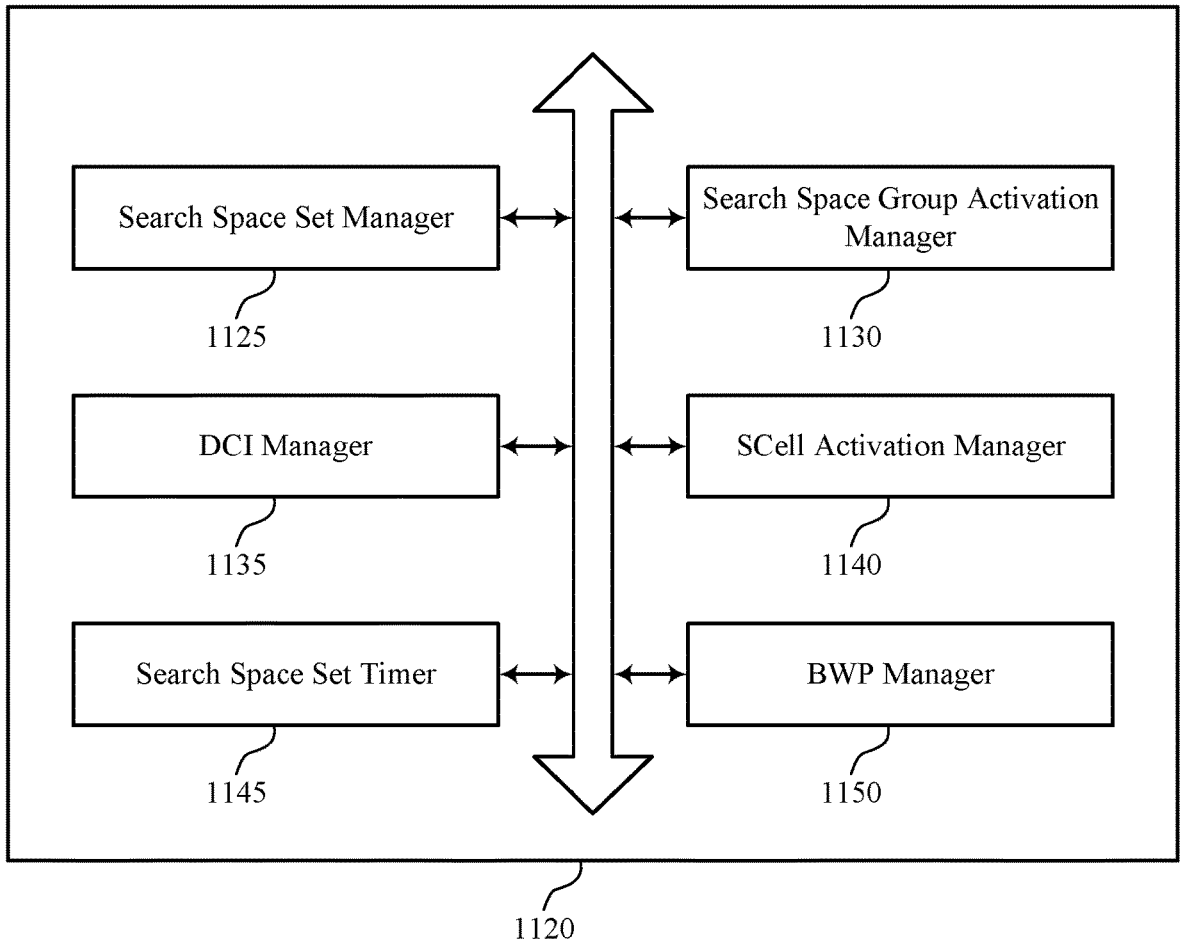
FIG. 11 shows a block diagram of a communications manager that supports search space set group switching for cross-carrier scheduling in accordance with aspects of the present disclosure.

FIG. 11 shows a block diagram 1100 of a communications manager 1120 that supports search space set group switching for cross-carrier scheduling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of search space set group switching for cross-carrier scheduling as described herein. For example, the communications manager 1120 may include a search space set manager 1125, a search space group activation manager 1130, a DCI manager 1135, a SCell activation manager 1140, a search space set timer 1145, a BWP manager 1150, or any combination thereof. Each of these components may communicate, directly or indirectly, with one another (e.g., via one or more buses).

The communications manager 1120 may support wireless communication at a UE in accordance with examples as disclosed herein. The search space set manager 1125 may be configured as or otherwise support a means for receiving, from an access network entity, multiple groups of search space sets that each identify one or more search spaces of one or more serving cells to be monitored for control information, where the multiple groups of search space sets include at least a first group of search space sets and a second group of search space sets, and where two or more serving cells are configured for concurrent communications between the UE and the access network entity. The search space group activation manager 1130 may be configured as or otherwise support a means for monitoring a first set of search spaces of the first group of search space sets based on resources associated with a first serving cell of the two or more serving cells being activated for communications. In some examples, the search space group activation manager 1130 may be configured as or otherwise support a means for monitoring a second set of search spaces of the second group of search space sets based on the resources associated with the first serving cell being deactivated for communication.

In some examples, the DCI manager 1135 may be configured as or otherwise support a means for receiving, from the access network entity, a first message to activate communications using the first serving cell, and where the first set of search spaces are monitored for control information responsive to the first message. In some examples, the DCI manager 1135 may be configured as or otherwise support a means for receiving, from the access network entity, a second message to deactivate communications using the first serving cell, and where the second set of search spaces are monitored for control information responsive to the second message. In some examples, the first set of search spaces includes separate search spaces for each serving cell of the two or more serving cells, and the second set of search spaces includes separate search spaces for each cell of the two or more serving cells, and where the search spaces are for one or more DCI formats scheduling shared channel transmissions, control channel transmissions, or combinations thereof.

In some examples, the first set of search spaces includes common search spaces for a PCell or a PSCell, and the second set of search spaces includes UE-specific search spaces for a secondary SCell for non-fallback DCI formats. In some examples, the first set of search spaces includes common search spaces or UE-specific search spaces for a PCell or a PSCell for fallback DCI formats, and the second set of search spaces includes UE-specific search spaces for a secondary SCell for non-fallback DCI formats. In some examples, the first set of search spaces includes common search spaces or UE-specific search spaces for a PCell or a PSCell for fallback or non-fallback DCI formats, and the second set of search spaces includes UE-specific search spaces for a secondary SCell for non-fallback DCI formats.

In some examples, the UE switches between the monitoring the first set of search spaces and the monitoring the second set of search spaces based on an explicit trigger from the access network entity. In some examples, the explicit trigger includes a flag bit in a DCI transmission or a DCI transmission in a specific search space of a monitored search space set. In some examples, the UE switches between the monitoring the first set of search spaces and the monitoring the second set of search spaces based on a secondary SCell activation or deactivation command. In some examples, the secondary SCell activation or deactivation command provides a time reference and the UE switches between the monitoring the first set of search spaces and the monitoring the second set of search spaces within a predetermined time after the time reference, or no later than the predetermined time after the time reference. In some examples, the UE switches between the monitoring the first set of search spaces and the monitoring the second set of search spaces based on a timer associated with one or more of the first set of search spaces or the second set of search spaces.

In some examples, the BWP manager 1150 may be configured as or otherwise support a means for receiving, from the access network entity, a first message to switch to an active BWP associated with the first serving cell, and where the first set of search spaces are monitored for control information responsive to the first message. In some examples, the BWP manager 1150 may be configured as or otherwise support a means for receiving, from the access network entity, a second message that indicates to switch away from the active BWP associated with the first serving cell, and where the second set of search spaces are monitored for control information responsive to the second message. In some examples, where the first set of search spaces are monitored for control information starting within a predetermined time after the first message.

Figure 12:
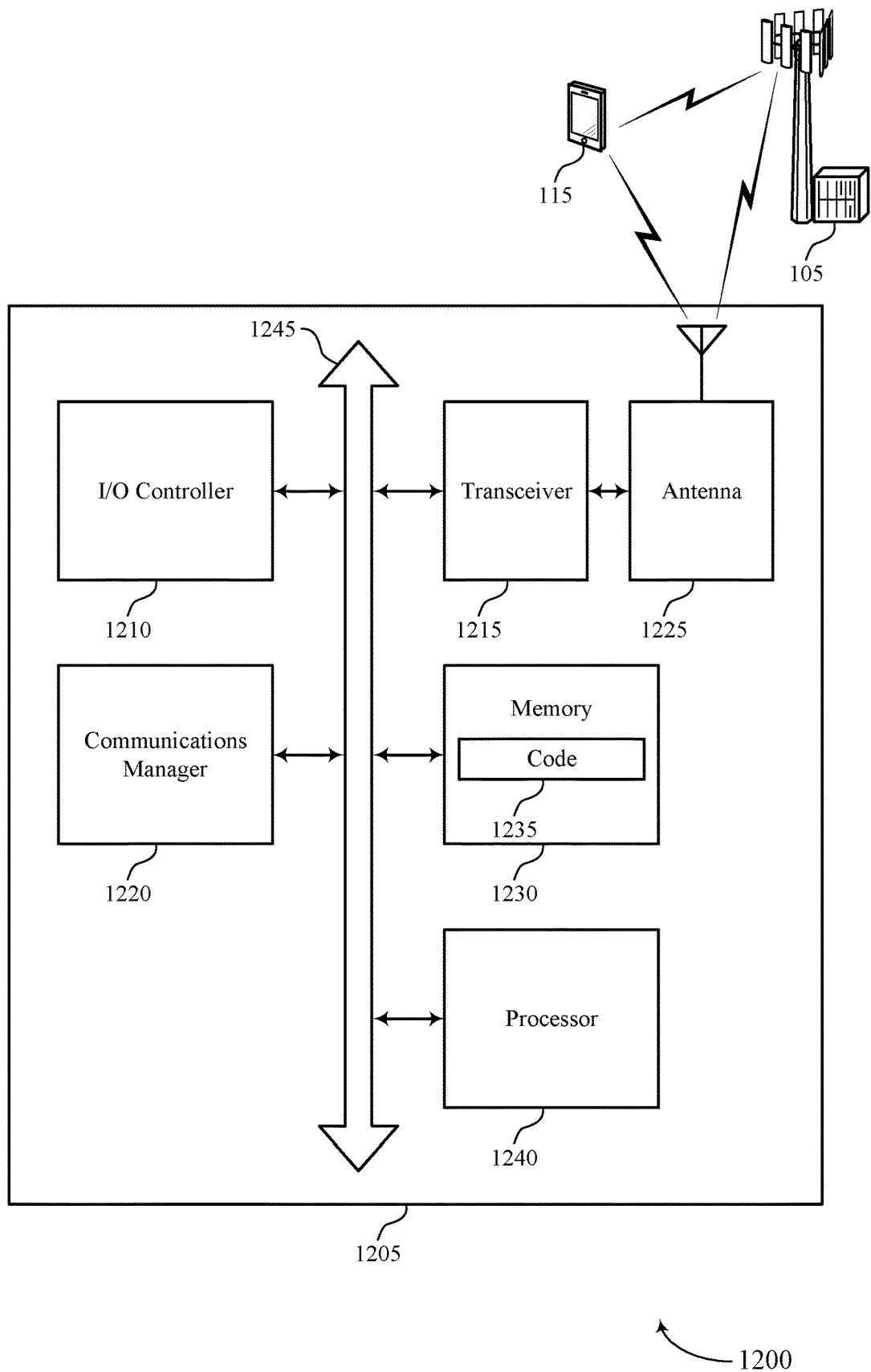
FIG. 12 shows a diagram of a system including a device that supports search space set group switching for cross-carrier scheduling in accordance with aspects of the present disclosure.

FIG. 12 shows a diagram of a system 1200 including a device 1205 that supports search space set group switching for cross-carrier scheduling in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting search space set group switching for cross-carrier scheduling). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, from an access network entity, multiple groups of search space sets that each identify one or more search spaces of one or more serving cells to be monitored for control information, where the multiple groups of search space sets include at least a first group of search space sets and a second group of search space sets, and where two or more serving cells are configured for concurrent communications between the UE and the access network entity. The communications manager 1220 may be configured as or otherwise support a means for monitoring a first set of search spaces of the first group of search space sets based on resources associated with a first serving cell of the two or more serving cells being activated for communications. The communications manager 1220 may be configured as or otherwise support a means for monitoring a second set of search spaces of the second group of search space sets based on the resources associated with the first serving cell being deactivated for communication.

By including or configuring the communications manager 1220 in accordance with examples as described herein, the device 1205 may support techniques for search space set group switching, which may provide for improved communication reliability, reduced latency, improved user experience related to reduced processing, reduced power consumption, more efficient utilization of communication resources, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of search space set group switching for cross-carrier scheduling as described herein, or the processor 1240 and the memory 1230 may be otherwise configured to perform or support such operations.

Figure 13:
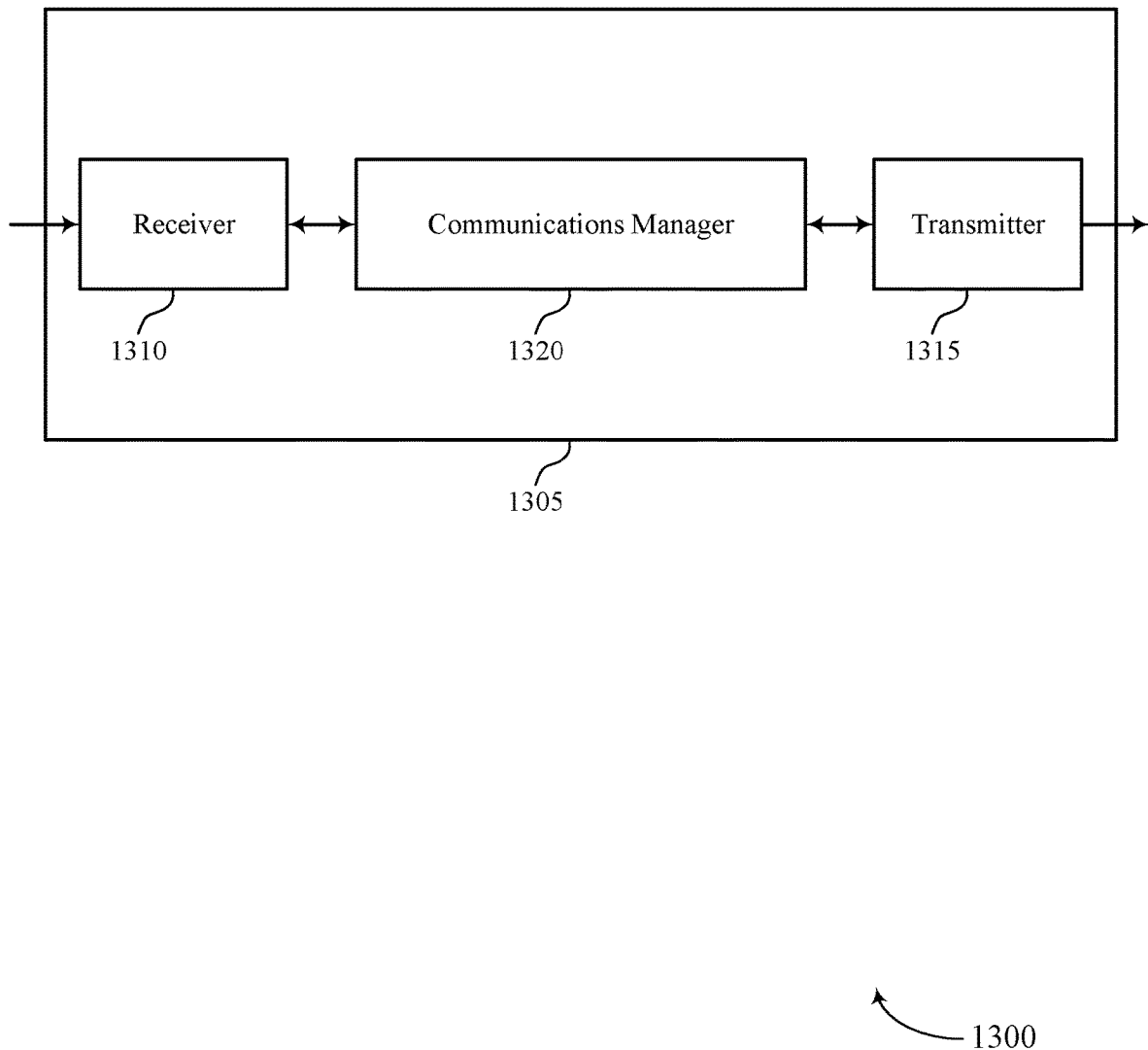
FIGS. 13 and 14 show block diagrams of devices that support search space set group switching for cross-carrier scheduling in accordance with aspects of the present disclosure.

FIG. 13 shows a block diagram 1300 of a device 1305 that supports search space set group switching for cross-carrier scheduling in accordance with aspects of the present disclosure. The device 1305 may be an example of aspects of a base station 105 or an access network entity as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to search space set group switching for cross-carrier scheduling). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to search space set group switching for cross-carrier scheduling). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of search space set group switching for cross-carrier scheduling as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at an access network entity in accordance with examples as disclosed herein. For example, the communications manager 1320 may be configured as or otherwise support a means for transmitting configuration information for multiple groups of search space sets that each identify one or more search spaces of one or more serving cells to be monitored by a UE for control information, where the multiple groups of search space sets include at least a first group of search space sets and a second group of search space sets, and where two or more serving cells are configured for concurrent communications between the UE and the access network entity. The communications manager 1320 may be configured as or otherwise support a means for transmitting control information via a first control information resource in a first set of search spaces of the first group of search space sets based on resources associated with a first serving cell of the two or more serving cells being activated for communications. The communications manager 1320 may be configured as or otherwise support a means for transmitting control information via a second control information resource in a second set of search spaces of the second group of search space sets based on the resources associated with the first serving cell being deactivated for communication.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for search space set group switching that provide for reduced processing requirements, reduced power consumption, and more efficient utilization of communication resources.

Figure 14:
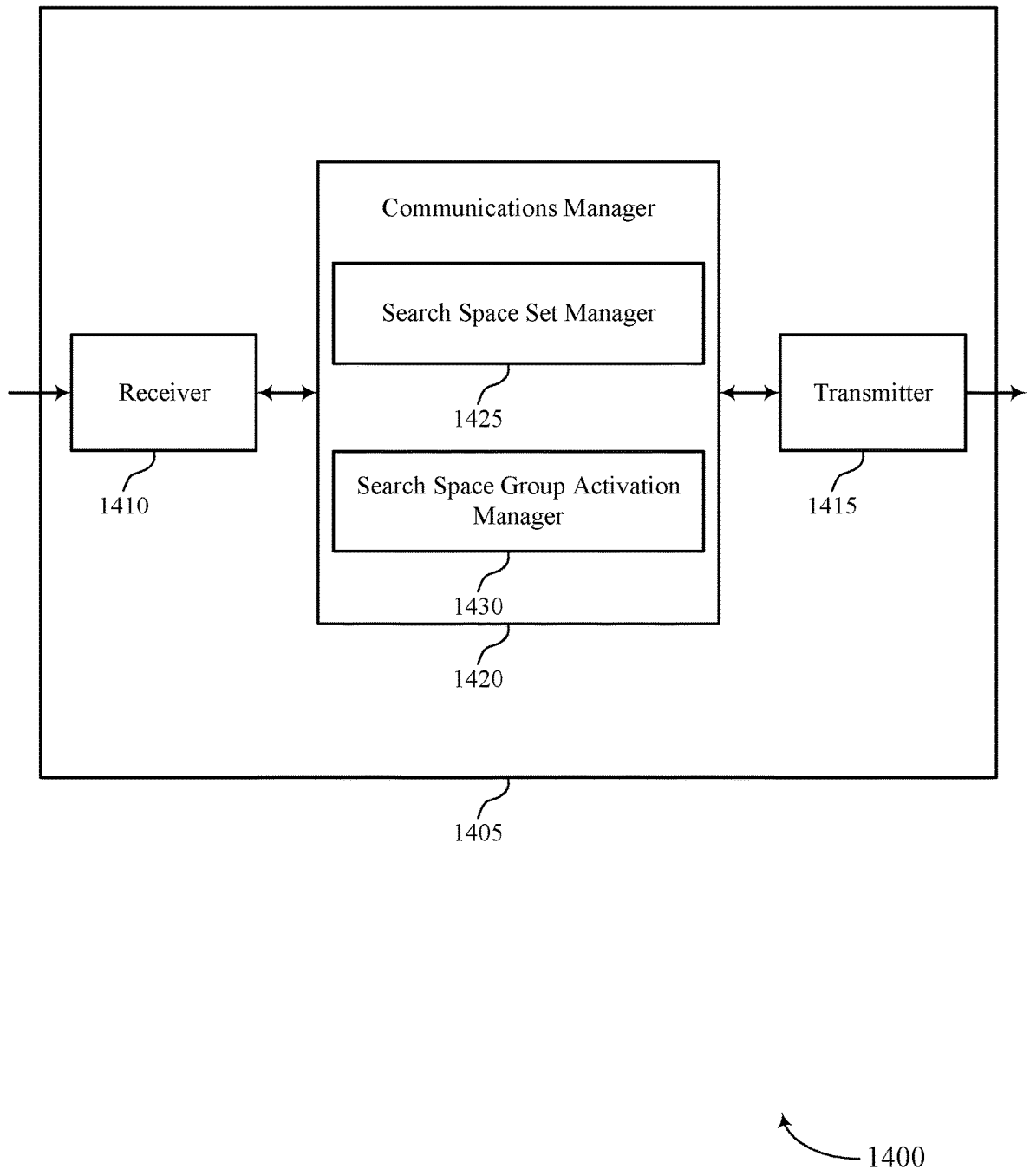

FIG. 14 shows a block diagram 1400 of a device 1405 that supports search space set group switching for cross-carrier scheduling in accordance with aspects of the present disclosure. The device 1405 may be an example of aspects of a device 1305, an access network entity, or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to search space set group switching for cross-carrier scheduling). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to search space set group switching for cross-carrier scheduling). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of search space set group switching for cross-carrier scheduling as described herein. For example, the communications manager 1420 may include a search space set manager 1425 a search space group activation manager 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at an access network entity in accordance with examples as disclosed herein. The search space set manager 1425 may be configured as or otherwise support a means for transmitting configuration information for multiple groups of search space sets that each identify one or more search spaces of one or more serving cells to be monitored by a UE for control information, where the multiple groups of search space sets include at least a first group of search space sets and a second group of search space sets, and where two or more serving cells are configured for concurrent communications between the UE and the access network entity. The search space group activation manager 1430 may be configured as or otherwise support a means for transmitting control information via a first control information resource in a first set of search spaces of the first group of search space sets based on resources associated with a first serving cell of the two or more serving cells being activated for communications. The search space group activation manager 1430 may be configured as or otherwise support a means for transmitting control information via a second control information resource in a second set of search spaces of the second group of search space sets based on the resources associated with the first serving cell being deactivated for communication.

Figure 15:
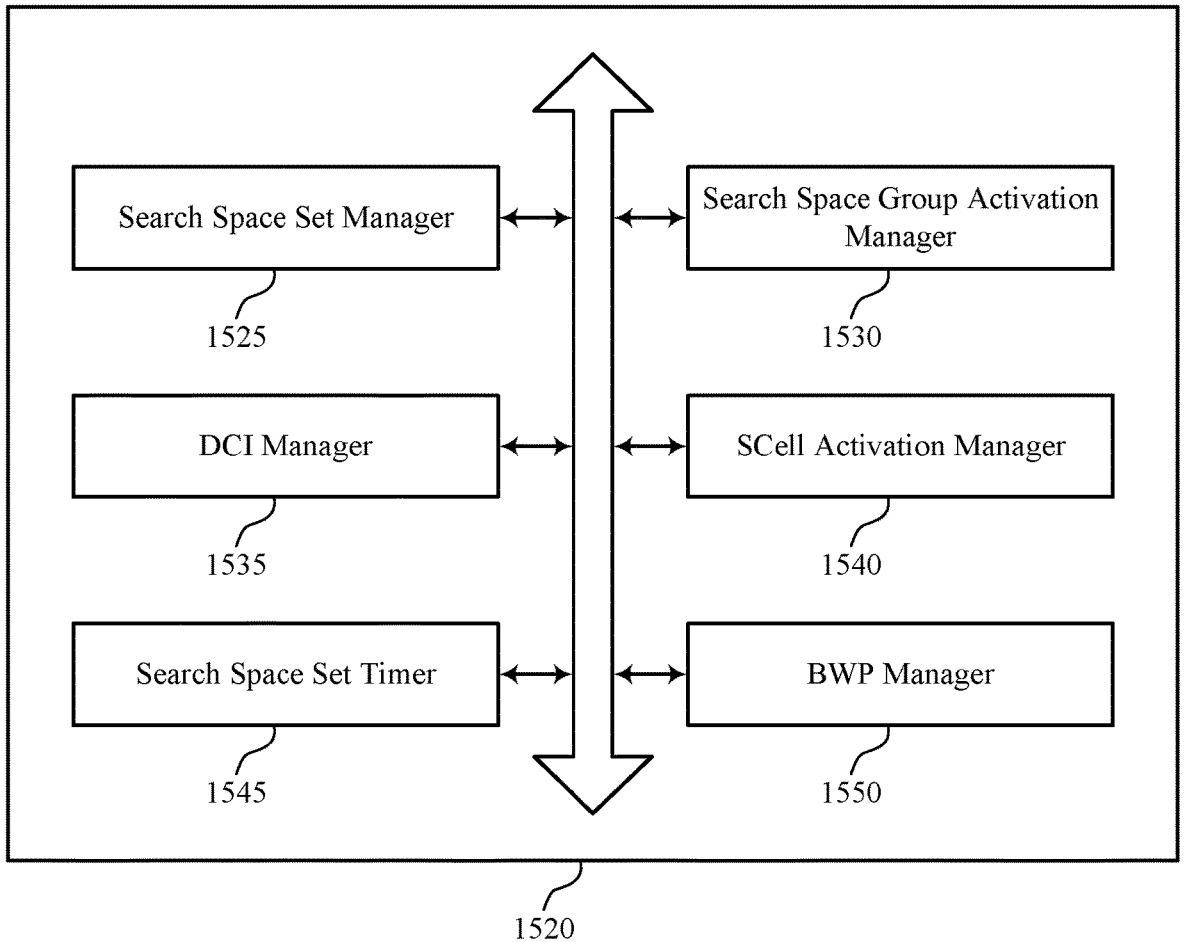
FIG. 15 shows a block diagram of a communications manager that supports search space set group switching for cross-carrier scheduling in accordance with aspects of the present disclosure.

FIG. 15 shows a block diagram 1500 of a communications manager 1520 that supports search space set group switching for cross-carrier scheduling in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of search space set group switching for cross-carrier scheduling as described herein. For example, the communications manager 1520 may include a search space set manager 1525, a search space group activation manager 1530, a DCI manager 1535, a SCell activation manager 1540, a search space set timer 1545, a BWP manager 1550, or any combination thereof. Each of these components may communicate, directly or indirectly, with one another (e.g., via one or more buses).

The communications manager 1520 may support wireless communication at an access network entity in accordance with examples as disclosed herein. The search space set manager 1525 may be configured as or otherwise support a means for transmitting configuration information for multiple groups of search space sets that each identify one or more search spaces of one or more serving cells to be monitored by a UE for control information, where the multiple groups of search space sets include at least a first group of search space sets and a second group of search space sets, and where two or more serving cells are configured for concurrent communications between the UE and the access network entity. The search space group activation manager 1530 may be configured as or otherwise support a means for transmitting control information via a first control information resource in a first set of search spaces of the first group of search space sets based on resources associated with a first serving cell of the two or more serving cells being activated for communications. In some examples, the search space group activation manager 1530 may be configured as or otherwise support a means for transmitting control information via a second control information resource in a second set of search spaces of the second group of search space sets based on the resources associated with the first serving cell being deactivated for communication.

In some examples, the DCI manager 1535 may be configured as or otherwise support a means for transmitting a first message to activate communications using the first serving cell, and where the first control information resource is selected from the first set of search spaces responsive to the first message. In some examples, the DCI manager 1535 may be configured as or otherwise support a means for transmitting a second message to deactivate communications using the first serving cell, and the second control information resource is selected from the second set of search spaces responsive to the second message.

In some examples, the first set of search spaces includes separate search spaces for each serving cell of the two or more serving cells, and where the second set of search spaces includes separate search spaces for each cell of the two or more serving cells. In some examples, the first set of search spaces includes common search spaces for a PCell or a PSCell, and the second set of search spaces includes UE-specific search spaces for a secondary SCell for non-fallback DCI formats. In some examples, the first set of search spaces includes common search spaces or UE-specific search spaces for a PCell or a PSCell for fallback DCI formats, and the second set of search spaces includes UE-specific search spaces for a secondary SCell for non-fallback DCI formats. In some examples, the first set of search spaces includes common search spaces or UE-specific search spaces for a PCell or a PSCell for fallback or non-fallback DCI formats, and the second set of search spaces includes UE-specific search spaces for a secondary SCell for non-fallback DCI formats.

In some examples, the search space group activation manager 1530 may be configured as or otherwise support a means for transmitting an explicit trigger to switch between monitoring the first set of search spaces and monitoring the second set of search spaces. In some examples, the explicit trigger includes a flag bit in a DCI transmission or a DCI transmission in a specific search space of a monitored search space set. In some examples, the access network entity switches between transmitting control information via the first set of search spaces or the second set of search spaces based on a secondary SCell activation or deactivation. In some examples, the access network entity switches between transmitting control information via the first set of search spaces or the second set of search spaces based on a timer associated with one or more of the first set of search spaces or the second set of search spaces.

In some examples, the BWP manager 1550 may be configured as or otherwise support a means for transmitting a first message to switch to an active BWP associated with the first serving cell, and where the first control information resource is selected from the first set of search spaces responsive to the first message. In some examples, the BWP manager 1550 may be configured as or otherwise support a means for transmitting a second message that indicates to switch away from the active BWP associated with the first serving cell, and where the second control information resource is selected from the second set of search spaces responsive to the second message.

Figure 16:
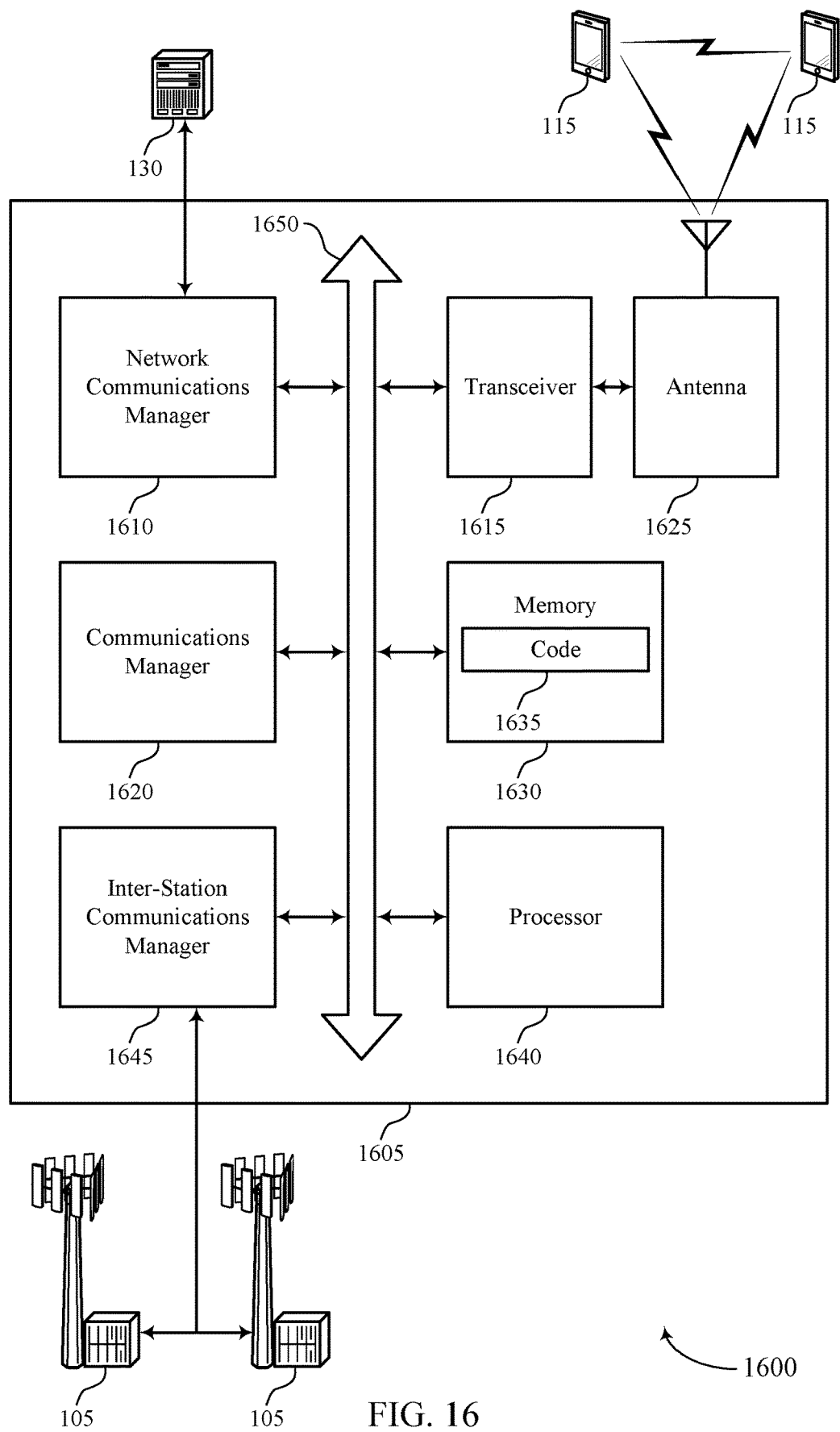
FIG. 16 shows a diagram of a system including a device that supports search space set group switching for cross-carrier scheduling in accordance with aspects of the present disclosure.

FIG. 16 shows a diagram of a system 1600 including a device 1605 that supports search space set group switching for cross-carrier scheduling in accordance with aspects of the present disclosure. The device 1605 may be an example of or include the components of a device 1305, a device 1405, an access network entity, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting search space set group switching for cross-carrier scheduling). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at an access network entity in accordance with examples as disclosed herein. For example, the communications manager 1620 may be configured as or otherwise support a means for transmitting configuration information for multiple groups of search space sets that each identify one or more search spaces of one or more serving cells to be monitored by a UE for control information, where the multiple groups of search space sets include at least a first group of search space sets and a second group of search space sets, and where two or more serving cells are configured for concurrent communications between the UE and the access network entity. The communications manager 1620 may be configured as or otherwise support a means for transmitting control information via a first control information resource in a first set of search spaces of the first group of search space sets based on resources associated with a first serving cell of the two or more serving cells being activated for communications. The communications manager 1620 may be configured as or otherwise support a means for transmitting control information via a second control information resource in a second set of search spaces of the second group of search space sets based on the resources associated with the first serving cell being deactivated for communication.

By including or configuring the communications manager 1620 in accordance with examples as described herein, the device 1605 may support techniques for search space set group switching, which may provide for improved communication reliability, reduced latency, improved user experience related to reduced processing, reduced power consumption, more efficient utilization of communication resources, longer battery life, and improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of search space set group switching for cross-carrier scheduling as described herein, or the processor 1640 and the memory 1630 may be otherwise configured to perform or support such operations.

Figure 17:
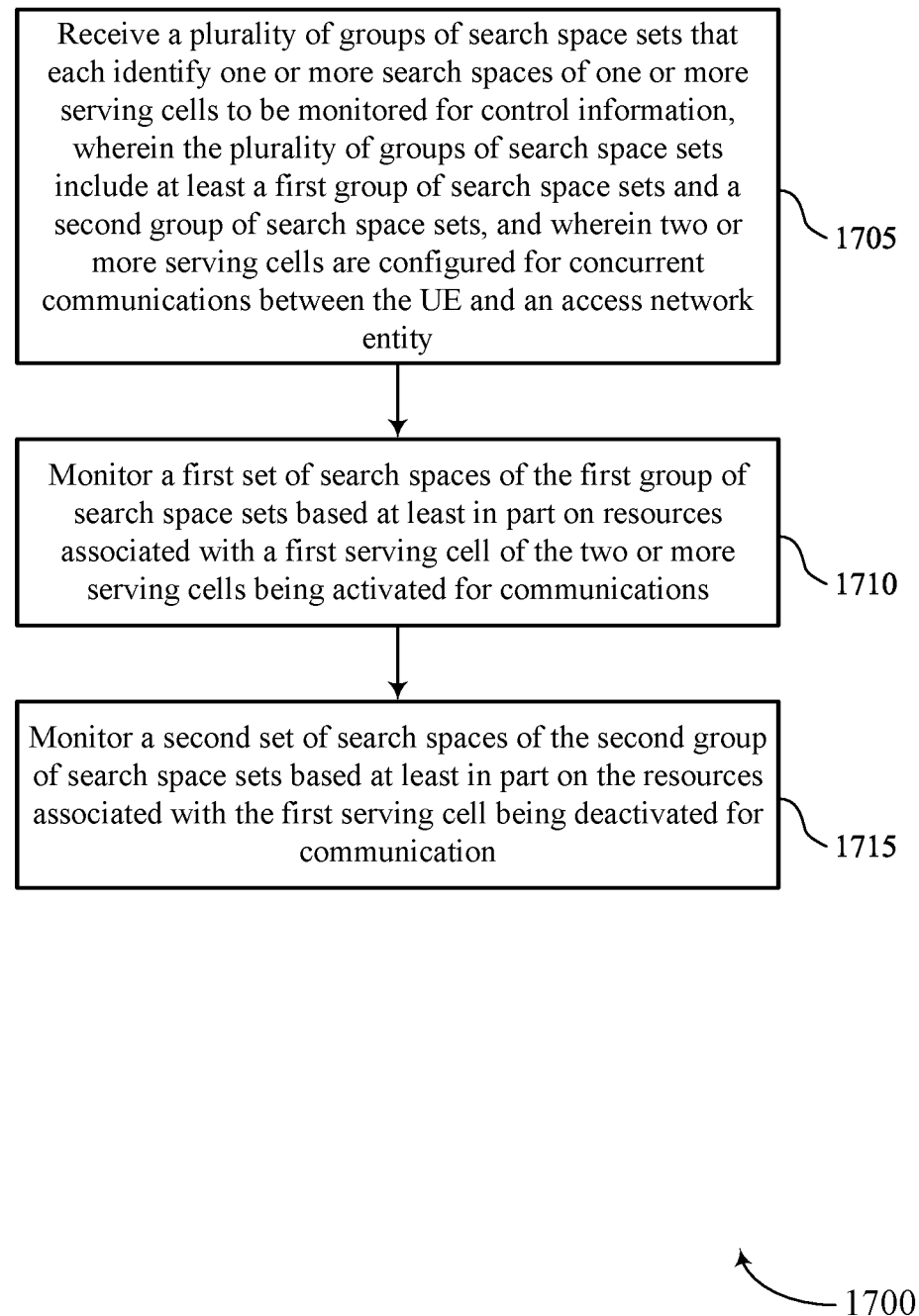
FIGS. 17 through 22 show flowcharts illustrating methods that support search space set group switching for cross-carrier scheduling in accordance with aspects of the present disclosure.

FIG. 17 shows a flowchart illustrating a method 1700 that supports search space set group switching for cross-carrier scheduling in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving, from an access network entity, multiple groups of search space sets that each identify one or more search spaces of one or more serving cells to be monitored for control information, where the multiple groups of search space sets include at least a first group of search space sets and a second group of search space sets, and where two or more serving cells are configured for concurrent communications between the UE and the access network entity. The operations of 1705 may be performed in accordance with examples as disclosed herein. In some examples, aspects of the operations of 1705 may be performed by a search space set manager 1125 as described with reference to FIG. 11.

At 1710, the method may include monitoring a first set of search spaces of the first group of search space sets based on resources associated with a first serving cell of the two or more serving cells being activated for communications. The operations of 1710 may be performed in accordance with examples as disclosed herein. In some examples, aspects of the operations of 1710 may be performed by a search space group activation manager 1130 as described with reference to FIG. 11.

At 1715, the method may include monitoring a second set of search spaces of the second group of search space sets based on the resources associated with the first serving cell being deactivated for communication. The operations of 1715 may be performed in accordance with examples as disclosed herein. In some examples, aspects of the operations of 1715 may be performed by a search space group activation manager 1130 as described with reference to FIG. 11.

Figure 18:
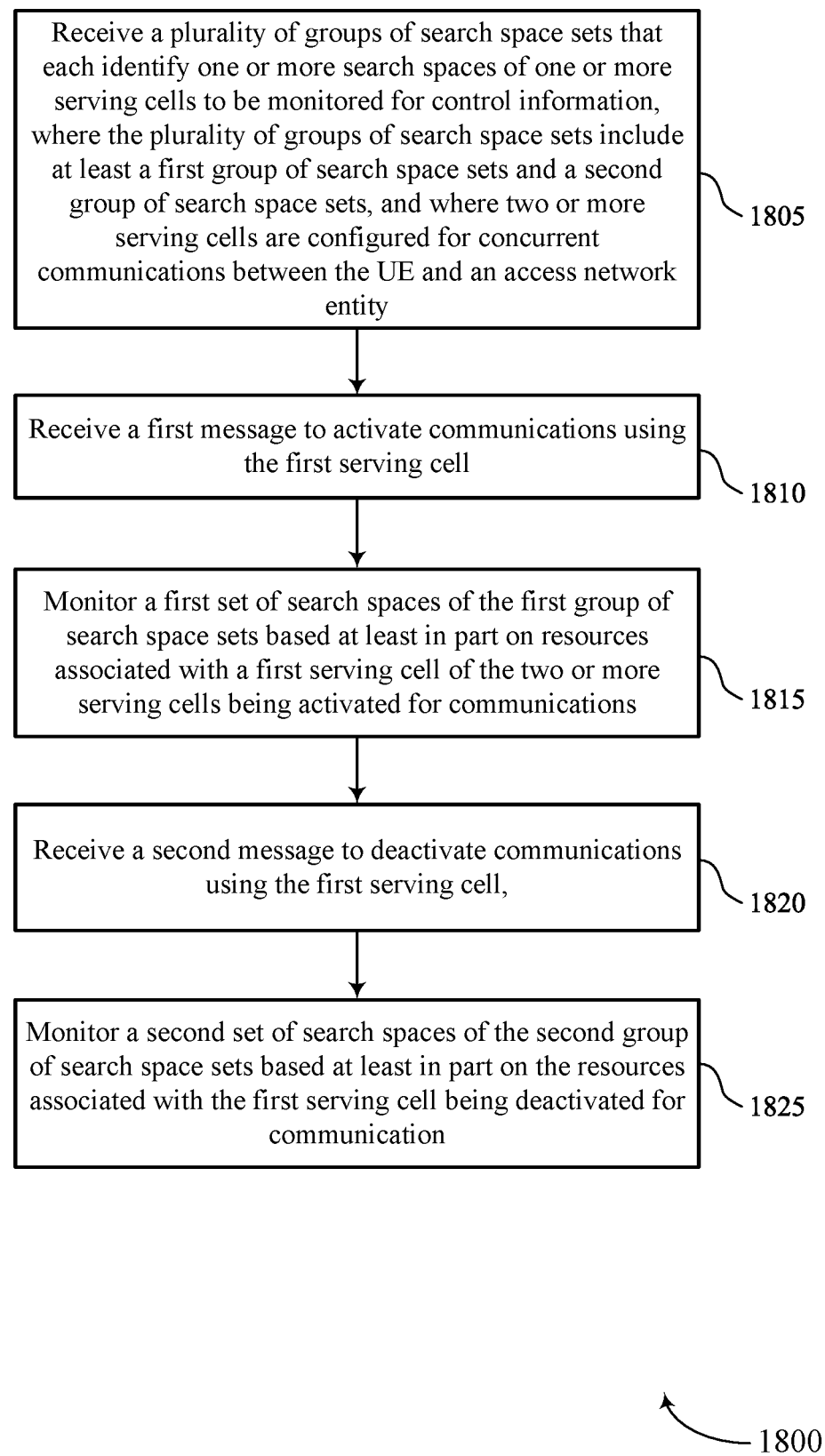

FIG. 18 shows a flowchart illustrating a method 1800 that supports search space set group switching for cross-carrier scheduling in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving, from an access network entity, multiple groups of search space sets that each identify one or more search spaces of one or more serving cells to be monitored for control information, where the multiple groups of search space sets include at least a first group of search space sets and a second group of search space sets, and where two or more serving cells are configured for concurrent communications between the UE and an access network entity. The operations of 1805 may be performed in accordance with examples as disclosed herein. In some examples, aspects of the operations of 1805 may be performed by a search space set manager 1125 as described with reference to FIG. 11.

At 1810, the method may include receiving a first message to activate communications using the first serving cell. The operations of 1810 may be performed in accordance with examples as disclosed herein. In some examples, aspects of the operations of 1810 may be performed by a DCI manager 1135 as described with reference to FIG. 11.

At 1815, the method may include monitoring a first set of search spaces of the first group of search space sets based on resources associated with a first serving cell of the two or more serving cells being activated for communications. The operations of 1815 may be performed in accordance with examples as disclosed herein. In some examples, aspects of the operations of 1815 may be performed by a search space group activation manager 1130 as described with reference to FIG. 11.

At 1820, the method may include receiving a second message to deactivate communications using the first serving cell. The operations of 1820 may be performed in accordance with examples as disclosed herein. In some examples, aspects of the operations of 1820 may be performed by a DCI manager 1135 as described with reference to FIG. 11.

At 1825, the method may include monitoring a second set of search spaces of the second group of search space sets based on the resources associated with the first serving cell being deactivated for communication. The operations of 1825 may be performed in accordance with examples as disclosed herein. In some examples, aspects of the operations of 1825 may be performed by a search space group activation manager 1130 as described with reference to FIG. 11.

Figure 19:
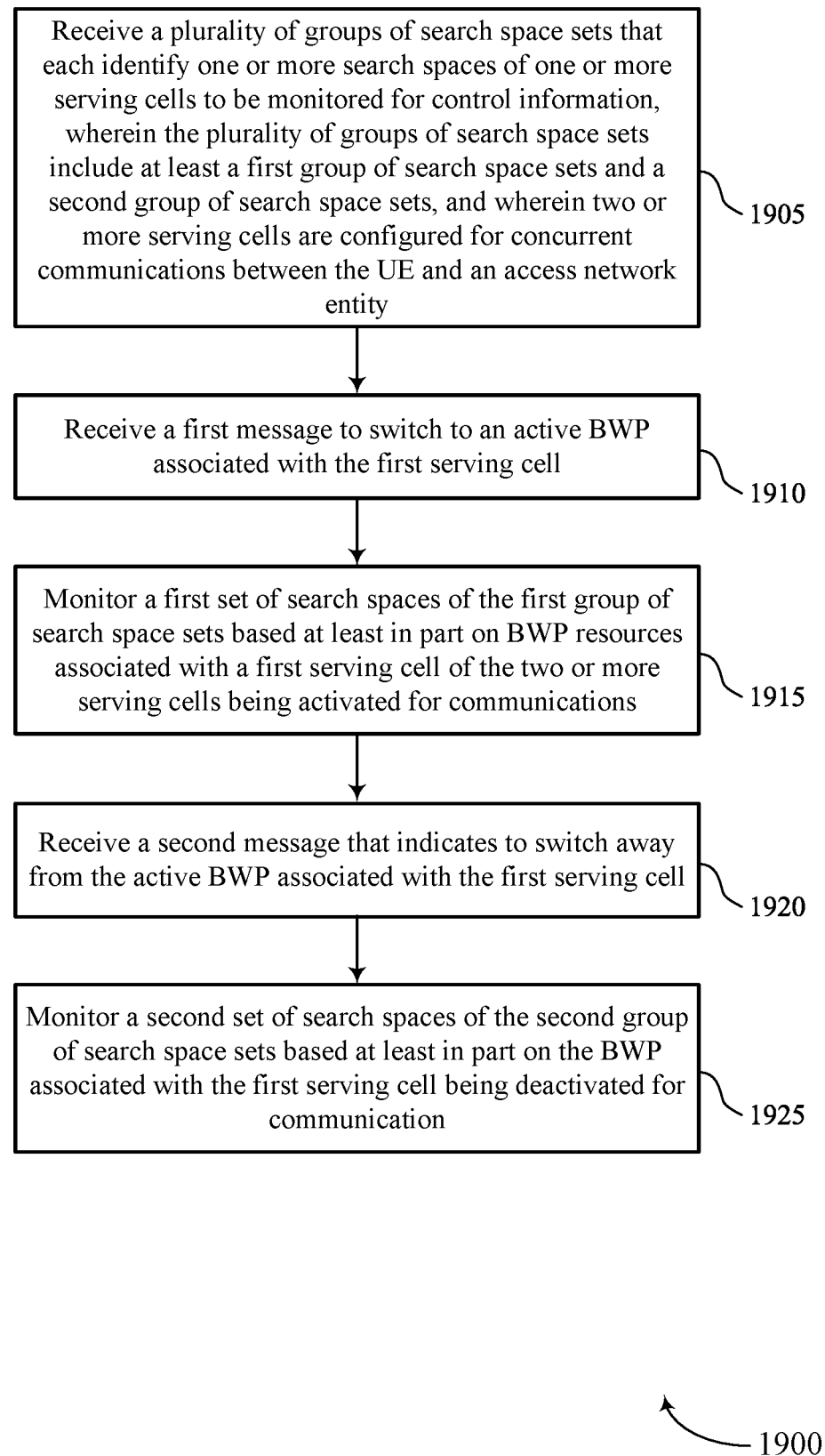

FIG. 19 shows a flowchart illustrating a method 1900 that supports search space set group switching for cross-carrier scheduling in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include receiving multiple groups of search space sets that each identify one or more search spaces of one or more serving cells to be monitored for control information, where the multiple groups of search space sets include at least a first group of search space sets and a second group of search space sets, and where two or more serving cells are configured for concurrent communications between the UE and an access network entity. The operations of 1905 may be performed in accordance with examples as disclosed herein. In some examples, aspects of the operations of 1905 may be performed by a search space set manager 1125 as described with reference to FIG. 11.

At 1910, the method may include receiving a first message to switch to an active BWP associated with the first serving cell. The operations of 1910 may be performed in accordance with examples as disclosed herein. In some examples, aspects of the operations of 1910 may be performed by a BWP manager 1150 as described with reference to FIG. 11.

At 1915, the method may include monitoring a first set of search spaces of the first group of search space sets based on the BWP associated with a first serving cell of the two or more serving cells being activated for communications. The operations of 1915 may be performed in accordance with examples as disclosed herein. In some examples, aspects of the operations of 1915 may be performed by a search space group activation manager 1130 as described with reference to FIG. 11.

At 1920, the method may include receiving a second message that indicates to switch away from the active BWP associated with the first serving cell. The operations of 1920 may be performed in accordance with examples as disclosed herein. In some examples, aspects of the operations of 1920 may be performed by a BWP manager 1150 as described with reference to FIG. 11.

At 1925, the method may include monitoring a second set of search spaces of the second group of search space sets based on the BWP associated with the first serving cell being deactivated for communication. The operations of 1925 may be performed in accordance with examples as disclosed herein. In some examples, aspects of the operations of 1925 may be performed by a search space group activation manager 1130 as described with reference to FIG. 11.

Figure 20:
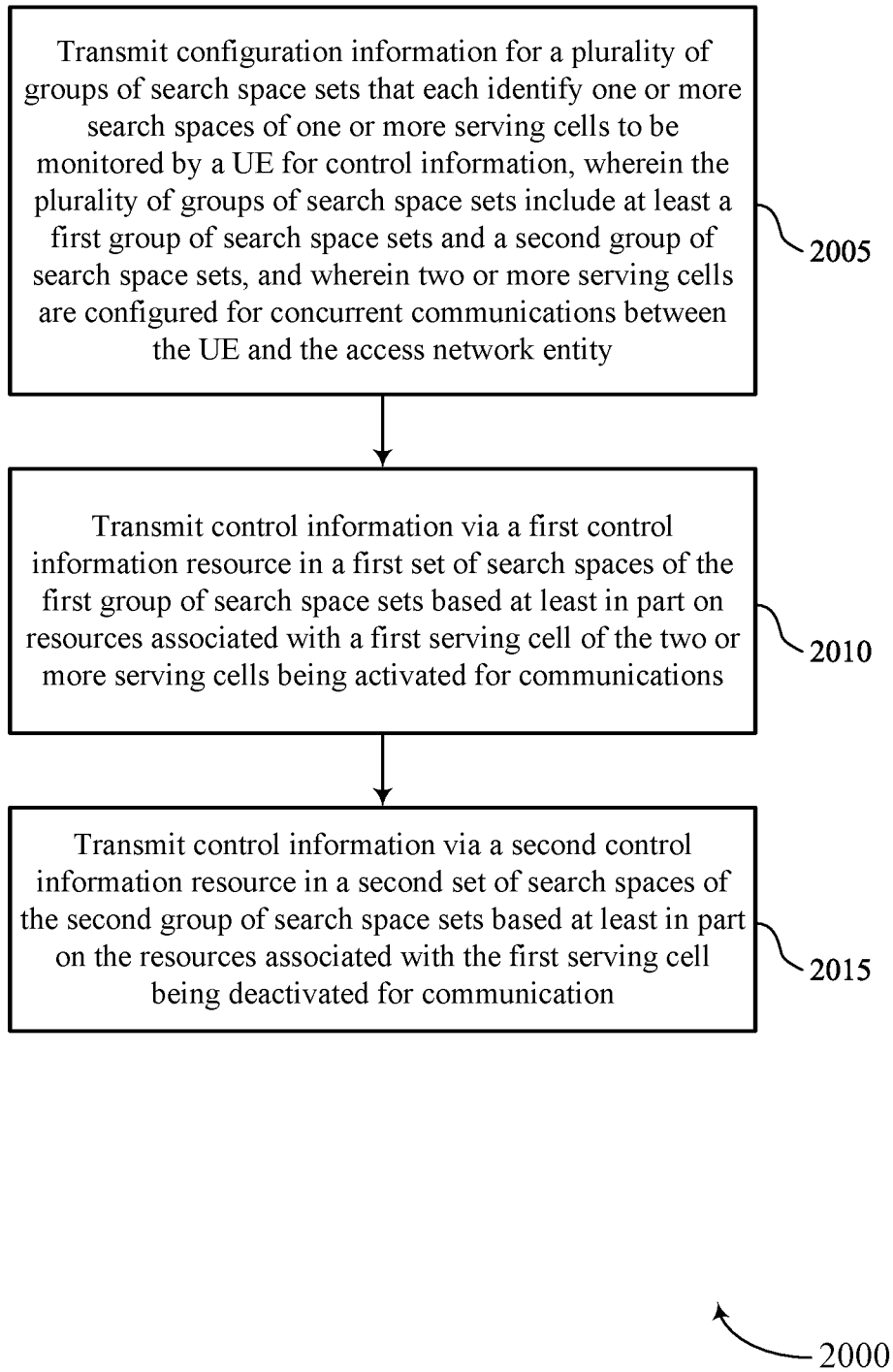

FIG. 20 shows a flowchart illustrating a method 2000 that supports search space set group switching for cross-carrier scheduling in accordance with aspects of the present disclosure. The operations of the method 2000 may be implemented by an access network entity or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2005, the method may include transmitting configuration information for multiple groups of search space sets that each identify one or more search spaces of one or more serving cells to be monitored by a UE for control information, where the multiple groups of search space sets include at least a first group of search space sets and a second group of search space sets, and where two or more serving cells are configured for concurrent communications between the UE and the access network entity. The operations of 2005 may be performed in accordance with examples as disclosed herein. In some examples, aspects of the operations of 2005 may be performed by a search space set manager 1525 as described with reference to FIG. 15.

At 2010, the method may include transmitting control information via a first control information resource in a first set of search spaces of the first group of search space sets based on resources associated with a first serving cell of the two or more serving cells being activated for communications. The operations of 2010 may be performed in accordance with examples as disclosed herein. In some examples, aspects of the operations of 2010 may be performed by a search space group activation manager 1530 as described with reference to FIG. 15.

At 2015, the method may include transmitting control information via a second control information resource in a second set of search spaces of the second group of search space sets based on the resources associated with the first serving cell being deactivated for communication. The operations of 2015 may be performed in accordance with examples as disclosed herein. In some examples, aspects of the operations of 2015 may be performed by a search space group activation manager 1530 as described with reference to FIG. 15.

Figure 21:
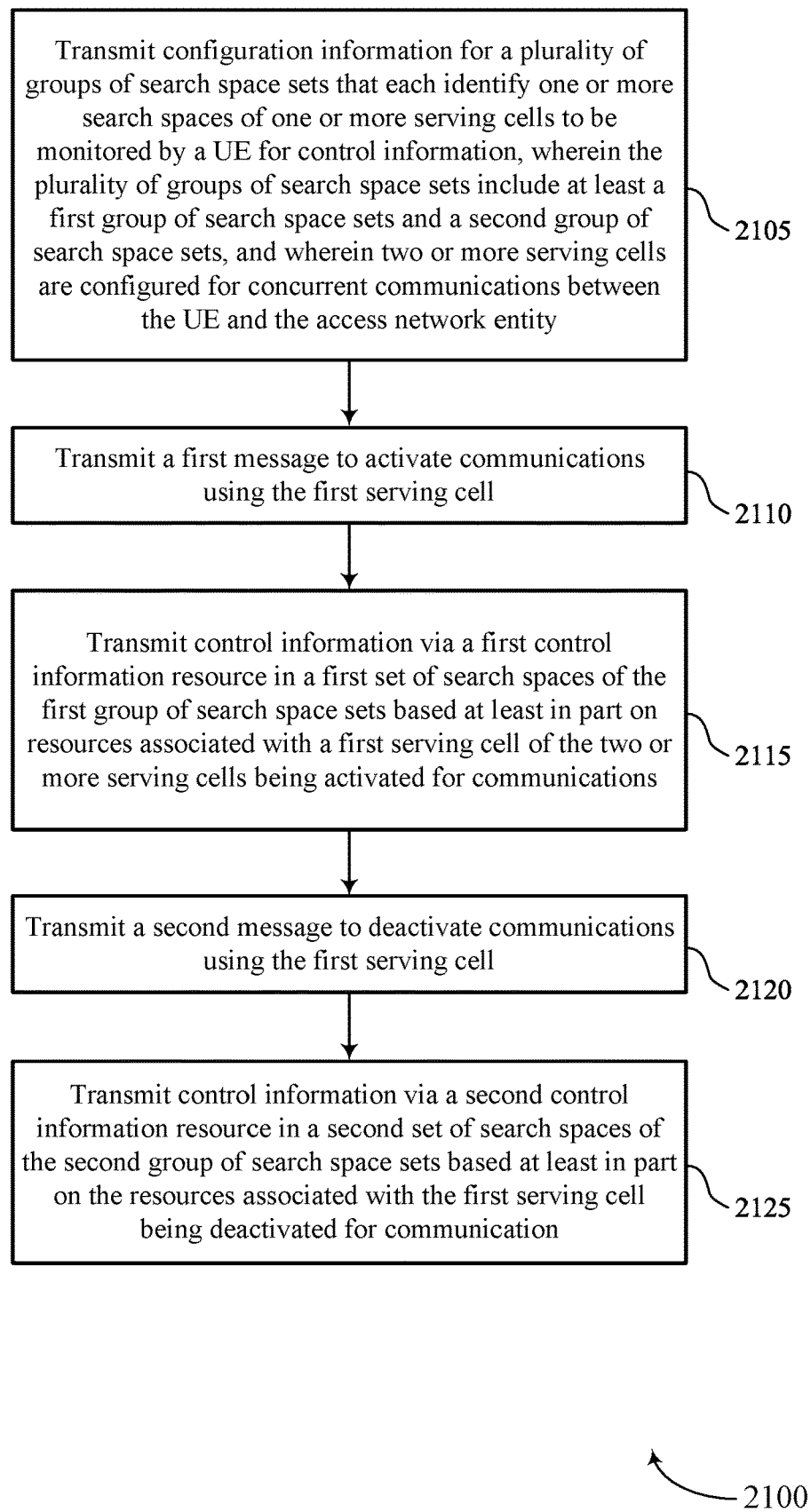

FIG. 21 shows a flowchart illustrating a method 2100 that supports search space set group switching for cross-carrier scheduling in accordance with aspects of the present disclosure. The operations of the method 2100 may be implemented by an access network entity or its components as described herein. For example, the operations of the method 2100 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2105, the method may include transmitting configuration information for multiple groups of search space sets that each identify one or more search spaces of one or more serving cells to be monitored by a UE for control information, where the multiple groups of search space sets include at least a first group of search space sets and a second group of search space sets, and where two or more serving cells are configured for concurrent communications between the UE and the access network entity. The operations of 2105 may be performed in accordance with examples as disclosed herein. In some examples, aspects of the operations of 2105 may be performed by a search space set manager 1525 as described with reference to FIG. 15.

At 2110, the method may include transmitting a first message to activate communications using the first serving cell. The operations of 2110 may be performed in accordance with examples as disclosed herein. In some examples, aspects of the operations of 2110 may be performed by a DCI manager 1535 as described with reference to FIG. 15.

At 2115, the method may include transmitting control information via a first control information resource in a first set of search spaces of the first group of search space sets based on resources associated with a first serving cell of the two or more serving cells being activated for communications. The operations of 2115 may be performed in accordance with examples as disclosed herein. In some examples, aspects of the operations of 2115 may be performed by a search space group activation manager 1530 as described with reference to FIG. 15.

At 2120, the method may include transmitting a second message to deactivate communications using the first serving cell. The operations of 2120 may be performed in accordance with examples as disclosed herein. In some examples, aspects of the operations of 2120 may be performed by a DCI manager 1535 as described with reference to FIG. 15.

At 2125, the method may include transmitting control information via a second control information resource in a second set of search spaces of the second group of search space sets based on the resources associated with the first serving cell being deactivated for communication. The operations of 2125 may be performed in accordance with examples as disclosed herein. In some examples, aspects of the operations of 2125 may be performed by a search space group activation manager 1530 as described with reference to FIG. 15.

Figure 22:
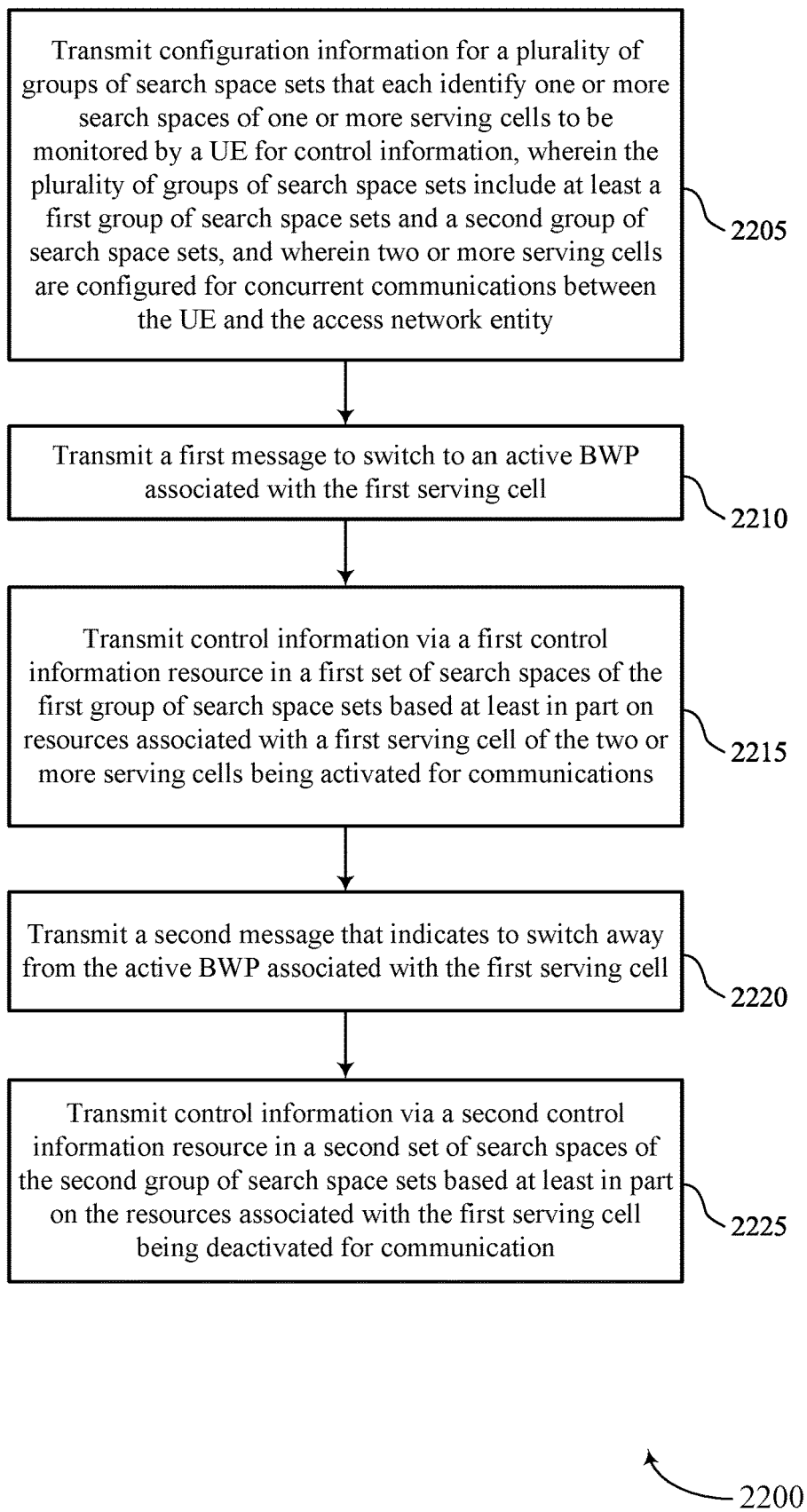

FIG. 22 shows a flowchart illustrating a method 2200 that supports search space set group switching for cross-carrier scheduling in accordance with aspects of the present disclosure. The operations of the method 2200 may be implemented by an access network entity or its components as described herein. For example, the operations of the method 2200 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2205, the method may include transmitting configuration information for multiple groups of search space sets that each identify one or more search spaces of one or more serving cells to be monitored by a UE for control information, where the multiple groups of search space sets include at least a first group of search space sets and a second group of search space sets, and where two or more serving cells are configured for concurrent communications between the UE and the access network entity. The operations of 2205 may be performed in accordance with examples as disclosed herein. In some examples, aspects of the operations of 2205 may be performed by a search space set manager 1525 as described with reference to FIG. 15.

At 2210, the method may include transmitting a first message to switch to an active BWP associated with the first serving cell, and where the first control information resource is selected from the first set of search spaces responsive to the first message. The operations of 2210 may be performed in accordance with examples as disclosed herein. In some examples, aspects of the operations of 2210 may be performed by a BWP manager 1550 as described with reference to FIG. 15.

At 2215, the method may include transmitting control information via a first control information resource in a first set of search spaces of the first group of search space sets based on resources associated with a first serving cell of the two or more serving cells being activated for communications. The operations of 2215 may be performed in accordance with examples as disclosed herein. In some examples, aspects of the operations of 2215 may be performed by a search space group activation manager 1530 as described with reference to FIG. 15.

At 2220, the method may include transmitting a second message that indicates to switch away from the active BWP associated with the first serving cell, and where the second control information resource is selected from the second set of search spaces responsive to the second message. The operations of 2220 may be performed in accordance with examples as disclosed herein. In some examples, aspects of the operations of 2220 may be performed by a BWP manager 1550 as described with reference to FIG. 15.

At 2225, the method may include transmitting control information via a second control information resource in a second set of search spaces of the second group of search space sets based on the resources associated with the first serving cell being deactivated for communication. The operations of 2225 may be performed in accordance with examples as disclosed herein. In some examples, aspects of the operations of 2225 may be performed by a search space group activation manager 1530 as described with reference to FIG. 15.

The following provides an overview of aspects of the present disclosure:

Aspect 1: A method for wireless communication at a UE, comprising: receiving a plurality of groups of search space sets that each identify one or more search spaces of one or more serving cells to be monitored for control information, wherein the plurality of groups of search space sets include at least a first group of search space sets and a second group of search space sets, and wherein two or more serving cells are configured for concurrent communications between the UE and an access network entity; monitoring a first set of search spaces of the first group of search space sets based at least in part on resources associated with a first serving cell of the two or more serving cells being activated for communications; and monitoring a second set of search spaces of the second group of search space sets based at least in part on the resources associated with the first serving cell being deactivated for communication.

Aspect 2: The method of aspect 1, further comprising: receiving a first message to activate communications using the first serving cell, and wherein the first set of search spaces are monitored for control information responsive to the first message.

Aspect 3: The method of any of aspects 1 through 2, further comprising: receiving a second message to deactivate communications using the first serving cell, and wherein the second set of search spaces are monitored for control information responsive to the second message.

Aspect 4: The method of any of aspects 1 through 3, wherein the first set of search spaces comprises separate search spaces for each serving cell of the two or more serving cells, and the second set of search spaces comprises separate search spaces for each cell of the two or more serving cells, and wherein the search spaces are for one or more DCI formats scheduling shared channel transmissions, control channel transmissions, or combinations thereof.

Aspect 5: The method of any of aspects 1 through 4, wherein the first set of search spaces comprises common search spaces for a primary cell (PCell) or a primary secondary cell (SCell), and the second set of search spaces comprises UE-specific search spaces for a secondary SCell for non-fallback DCI formats.

Aspect 6: The method of any of aspects 1 through 5, wherein the first set of search spaces comprises common search spaces or UE-specific search spaces for a primary cell (PCell) or a primary secondary cell (SCell) for fallback DCI formats, and the second set of search spaces comprises UE-specific search spaces for a secondary SCell for non-fallback DCI formats.

Aspect 7: The method of any of aspects 1 through 5, wherein the first set of search spaces comprises common search spaces or UE-specific search spaces for a primary cell (PCell) or a primary secondary cell (SCell) for fallback or non-fallback DCI formats, and the second set of search spaces comprises UE-specific search spaces for a secondary SCell for non-fallback DCI formats.

Aspect 8: The method of any of aspects 1 through 7, wherein the UE switches between the monitoring the first set of search spaces and the monitoring the second set of search spaces based at least in part on an explicit trigger from the access network entity.

Aspect 9: The method of aspect 8, wherein the explicit trigger comprises a flag bit in a DCI transmission or a DCI transmission in a specific search space of a monitored search space set.

Aspect 10: The method of any of aspects 1 through 9, wherein the UE switches between the monitoring the first set of search spaces and the monitoring the second set of search spaces based at least in part on a secondary SCell activation or deactivation command.

Aspect 11: The method of aspect 10, wherein the secondary SCell activation or deactivation command provides a time reference and the UE switches between the monitoring the first set of search spaces and the monitoring the second set of search spaces within a predetermined time after the time reference.

Aspect 12: The method of any of aspects 1 through 9, wherein the UE switches between the monitoring the first set of search spaces and the monitoring the second set of search spaces based at least in part on a timer associated with one or more of the first set of search spaces or the second set of search spaces.

Aspect 13: The method of aspect 1, further comprising: receiving a first message to switch to an active bandwidth part (BWP) associated with the first serving cell, and wherein the first set of search spaces are monitored for control information responsive to the first message; and receiving a second message that indicates to switch away from the active BWP associated with the first serving cell, and wherein the second set of search spaces are monitored for control information responsive to the second message.

Aspect 14: The method of aspect 13, wherein the first set of search spaces are monitored for control information starting within a predetermined time after the first message.

Aspect 15: A method for wireless communication at an access network entity, comprising: transmitting configuration information for a plurality of groups of search space sets that each identify one or more search spaces of one or more serving cells to be monitored by a UE for control information, wherein the plurality of groups of search space sets include at least a first group of search space sets and a second group of search space sets, and wherein two or more serving cells are configured for concurrent communications between the UE and the access network entity; transmitting control information via a first control information resource in a first set of search spaces of the first group of search space sets based at least in part on resources associated with a first serving cell of the two or more serving cells being activated for communications; and transmitting control information via a second control information resource in a second set of search spaces of the second group of search space sets based at least in part on the resources associated with the first serving cell being deactivated for communication.

Aspect 16: The method of aspect 15, further comprising: transmitting a first message to activate communications using the first serving cell, and wherein the first control information resource is selected from the first set of search spaces responsive to the first message; and transmitting a second message to deactivate communications using the first serving cell, and the second control information resource is selected from the second set of search spaces responsive to the second message.

Aspect 17: The method of any of aspects 15 through 16, wherein the first set of search spaces comprises separate search spaces for each serving cell of the two or more serving cells, and wherein the second set of search spaces comprises separate search spaces for each cell of the two or more serving cells.

Aspect 18: The method of any of aspects 15 through 17, wherein the first set of search spaces comprises common search spaces for a primary cell (PCell) or a primary secondary cell (SCell), and the second set of search spaces comprises UE-specific search spaces for a secondary SCell for non-fallback DCI formats.

Aspect 19: The method of any of aspects 15 through 18, wherein the first set of search spaces comprises common search spaces or UE-specific search spaces for a primary cell (PCell) or a primary secondary cell (SCell) for fallback DCI formats, and the second set of search spaces comprises UE-specific search spaces for a secondary SCell for non-fallback DCI formats.

Aspect 20: The method of any of aspects 15 through 18, wherein the first set of search spaces comprises common search spaces or UE-specific search spaces for a primary cell (PCell) or a primary secondary cell (SCell) for fallback or non-fallback DCI formats, and the second set of search spaces comprises UE-specific search spaces for a secondary SCell for non-fallback DCI formats.

Aspect 21: The method of any of aspects 15 through 20, further comprising: transmitting an explicit trigger to switch between monitoring the first set of search spaces and monitoring the second set of search spaces.

Aspect 22: The method of aspect 21, wherein the explicit trigger comprises a flag bit in a DCI transmission or a DCI transmission in a specific search space of a monitored search space set.

Aspect 23: The method of any of aspects 15 through 22, wherein the access network entity switches between transmitting control information via the first set of search spaces or the second set of search spaces based at least in part on a secondary SCell activation or deactivation.

Aspect 24: The method of any of aspects 15 through 22, wherein the access network entity switches between transmitting control information via the first set of search spaces or the second set of search spaces based at least in part on a timer associated with one or more of the first set of search spaces or the second set of search spaces.

Aspect 25: The method of aspect 15, further comprising: transmitting a first message to switch to an active bandwidth part (BWP) associated with the first serving cell, and wherein the first control information resource is selected from the first set of search spaces responsive to the first message; and transmitting a second message that indicates to switch away from the active BWP associated with the first serving cell, and wherein the second control information resource is selected from the second set of search spaces responsive to the second message.

Aspect 26: An apparatus for wireless communication at a UE, comprising a processor; memory coupled with the processor; and instructions stored in the memory and executable by the processor to cause the apparatus to perform a method of any of aspects 1 through 14.

Aspect 27: An apparatus for wireless communication at a UE, comprising at least one means for performing a method of any of aspects 1 through 14.

Aspect 28: A non-transitory computer-readable medium storing code for wireless communication at a UE, the code comprising instructions executable by a processor to perform a method of any of aspects 1 through 14.

Aspect 29: An apparatus for wireless communication at an access network entity, comprising a processor; memory coupled with the processor; and instructions stored in the memory and executable by the processor to cause the apparatus to perform a method of any of aspects 15 through 25.

Aspect 30: An apparatus for wireless communication at an access network entity, comprising at least one means for performing a method of any of aspects 15 through 25.

Aspect 31: A non-transitory computer-readable medium storing code for wireless communication at an access network entity, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    a processor;
    memory coupled with the processor; and
    instructions stored in the memory and executable by the processor to cause the apparatus to:
        receive a plurality of groups of search space sets that each identify one or more search spaces of one or more serving cells to be monitored for control information, wherein the plurality of groups of search space sets include at least a first group of search space sets and a second group of search space sets, and wherein two or more serving cells are configured for concurrent communications between the UE and an access network entity;
        monitor a first set of search spaces of the first group of search space sets based at least in part on resources associated with a first serving cell of the two or more serving cells being activated for communications; and
        monitor a second set of search spaces of the second group of search space sets based at least in part on the resources associated with the first serving cell being deactivated for communication.

2. The apparatus of claim 1, wherein the UE switches between monitoring the first set of search spaces and monitoring the second set of search spaces based at least in part on a secondary SCell activation or deactivation command.

3. The apparatus of claim 2, wherein the secondary SCell activation or deactivation command provides a time reference and the UE switches between monitoring the first set of search spaces and monitoring the second set of search spaces within a predetermined time after the time reference.

4. The apparatus of claim 1, wherein the UE switches between monitoring the first set of search spaces and monitoring the second set of search spaces based at least in part on a timer associated with one or more of the first set of search spaces or the second set of search spaces.

5. The apparatus of claim 1, wherein the instructions are further executable by the processor to cause the apparatus to:
    receive a first message to switch to an active bandwidth part (BWP) associated with the first serving cell, and wherein the first set of search spaces are monitored for control information responsive to the first message; and
    receive a second message that indicates to switch away from the active BWP associated with the first serving cell, and wherein the second set of search spaces are monitored for control information responsive to the second message.

6. The apparatus of claim 5, wherein the first set of search spaces are monitored for control information starting within a predetermined time after the first message.

7. The apparatus of claim 1, wherein the instructions are further executable by the processor to cause the apparatus to:
    receive a first message to activate communications using the first serving cell, and wherein the first set of search spaces are monitored for control information responsive to the first message.

8. The apparatus of claim 1, wherein the instructions are further executable by the processor to cause the apparatus to:
    receive a second message to deactivate communications using the first serving cell, and wherein the second set of search spaces are monitored for control information responsive to the second message.

9. The apparatus of claim 1, wherein the first set of search spaces comprises separate search spaces for each serving cell of the two or more serving cells, and the second set of search spaces comprises separate search spaces for each cell of the two or more serving cells, and wherein the search spaces are for one or more downlink control information (DCI) formats scheduling shared channel transmissions, control channel transmissions, or combinations thereof.

10. The apparatus of claim 1, wherein the first set of search spaces comprises common search spaces for a primary cell (PCell) or a primary secondary cell (SCell), and the second set of search spaces comprises UE-specific search spaces for a secondary SCell for non-fallback downlink control information (DCI) formats.

11. The apparatus of claim 1, wherein the first set of search spaces comprises common search spaces or UE-specific search spaces for a primary cell (PCell) or a primary secondary cell (SCell) for fallback downlink control information (DCI) formats, and the second set of search spaces comprises UE-specific search spaces for a secondary SCell for non-fallback DCI formats.

12. The apparatus of claim 1, wherein the first set of search spaces comprises common search spaces or UE-specific search spaces for a primary cell (PCell) or a primary secondary cell (SCell) for fallback or non-fallback downlink control information (DCI) formats, and the second set of search spaces comprises UE-specific search spaces for a secondary SCell for non-fallback DCI formats.

13. The apparatus of claim 1, wherein the UE switches between monitoring the first set of search spaces and monitoring the second set of search spaces based at least in part on an explicit trigger from the access network entity.

14. The apparatus of claim 13, wherein the explicit trigger comprises a flag bit in a downlink control information (DCI) transmission or a DCI transmission in a specific search space of a monitored search space set.

15. An apparatus for wireless communication at an access network entity, comprising:
a processor;
memory coupled with the processor; and
instructions stored in the memory and executable by the processor to cause the apparatus to:
transmit configuration information for a plurality of groups of search space sets that each identify one or more search spaces of one or more serving cells to be monitored by a user equipment (UE) for control information, wherein the plurality of groups of search space sets include at least a first group of search space sets and a second group of search space sets, and wherein two or more serving cells are configured at the UE for concurrent communications;
transmit control information via a first control information resource in a first set of search spaces of the first group of search space sets based at least in part on resources associated with a first serving cell of the two or more serving cells being activated for communications; and
transmit control information via a second control information resource in a second set of search spaces of the second group of search space sets based at least in part on the resources associated with the first serving cell being deactivated for communication.

16. The apparatus of claim 15, wherein the access network entity switches between transmitting control information via the first set of search spaces or the second set of search spaces based at least in part on a secondary cell activation or deactivation.

17. The apparatus of claim 15, wherein the access network entity switches between transmitting control information via the first set of search spaces or the second set of search spaces based at least in part on a timer associated with one or more of the first set of search spaces or the second set of search spaces.

18. The apparatus of claim 15, wherein the instructions are further executable by the processor to cause the apparatus to:
transmit a first message to switch to an active bandwidth part (BWP) associated with the first serving cell, and wherein the first control information resource is selected from the first set of search spaces responsive to the first message; and
transmit a second message that indicates to switch away from the active BWP associated with the first serving cell, and wherein the second control information resource is selected from the second set of search spaces responsive to the second message.

19. The apparatus of claim 15, wherein the instructions are further executable by the processor to cause the apparatus to:
transmit a first message to activate communications using the first serving cell, and wherein the first control information resource is selected from the first set of search spaces responsive to the first message; and
transmit a second message to deactivate communications using the first serving cell, and the second control information resource is selected from the second set of search spaces responsive to the second message.

20. The apparatus of claim 15, wherein the first set of search spaces comprises separate search spaces for each serving cell of the two or more serving cells, and wherein the second set of search spaces comprises separate search spaces for each cell of the two or more serving cells.

21. The apparatus of claim 15, wherein the first set of search spaces comprises common search spaces for a primary cell (PCell) or a primary secondary cell (SCell), and the second set of search spaces comprises UE-specific search spaces for a secondary SCell for non-fallback downlink control information (DCI) formats.

22. The apparatus of claim 15, wherein the first set of search spaces comprises common search spaces or UE-specific search spaces for a primary cell (PCell) or a primary secondary cell (SCell) for fallback downlink control information (DCI) formats, and the second set of search spaces comprises UE-specific search spaces for a secondary SCell for non-fallback DCI formats.

23. The apparatus of claim 15, wherein the first set of search spaces comprises common search spaces or UE-specific search spaces for a primary cell (PCell) or a primary secondary cell (SCell) for fallback or non-fallback downlink control information (DCI) formats, and the second set of search spaces comprises UE-specific search spaces for a secondary SCell for non-fallback DCI formats.

24. The apparatus of claim 15, wherein the instructions are further executable by the processor to cause the apparatus to:
transmit an explicit trigger to indicate to the UE to switch between monitoring the first set of search spaces and monitoring the second set of search spaces.

25. The apparatus of claim 24, wherein the explicit trigger comprises a flag bit in a downlink control information (DCI) transmission or a DCI transmission in a specific search space of a monitored search space set.

26. A method for wireless communication at a user equipment (UE), comprising:
receiving, a plurality of groups of search space sets that each identify one or more search spaces of one or more serving cells to be monitored for control information, wherein the plurality of groups of search space sets include at least a first group of search space sets and a second group of search space sets, and wherein two or more serving cells are configured for concurrent communications between the UE and the access network entity;
monitoring a first set of search spaces of the first group of search space sets based at least in part on resources associated with a first serving cell of the two or more serving cells being activated for communications; and
monitoring a second set of search spaces of the second group of search space sets based at least in part on the resources associated with the first serving cell being deactivated for communication.

27. The method of claim 26, further comprising:
receiving a first message to activate communications using the first serving cell, and wherein the first set of search spaces are monitored for control information responsive to the first message.

28. The method of claim 26, further comprising:
receiving a second message to deactivate communications using the first serving cell, and wherein the second set of search spaces are monitored for control information responsive to the second message.

29. A method for wireless communication at an access network entity, comprising:
transmitting configuration information for a plurality of groups of search space sets that each identify one or more search spaces of one or more serving cells to be monitored by a user equipment (UE) for control information, wherein the plurality of groups of search space sets include at least a first group of search space sets and a second group of search space sets, and wherein two or more serving cells are configured for concurrent communications between the UE and the access network entity;

transmitting control information to the UE via a first control information resource in a first set of search spaces of the first group of search space sets based at least in part on resources associated with a first serving cell of the two or more serving cells being activated for communications; and transmitting control information to the UE via a second control information resource in a second set of search spaces of the second group of search space sets based at least in part on the resources associated with the first serving cell being deactivated for communication.

30. The method of claim 29, further comprising:
transmitting a first message to activate communications using the first serving cell, and wherein the first control information resource is selected from the first set of search spaces responsive to the first message; and transmitting a second message to deactivate communications using the first serving cell, and the second control information resource is selected from the second set of search spaces responsive to the second message.

* * * * *